(12) United States Patent
Yoshikawa et al.

(10) Patent No.: US 11,380,319 B2
(45) Date of Patent: Jul. 5, 2022

(54) CHARGING STAND, MOBILE TERMINAL, COMMUNICATION SYSTEM, METHOD, AND PROGRAM

(71) Applicant: KYOCERA Corporation, Kyoto (JP)

(72) Inventors: Joji Yoshikawa, Sagamihara (JP); Yuki Yamada, Yokohama (JP); Hiroshi Okamoto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 119 days.

(21) Appl. No.: 16/634,120

(22) PCT Filed: Jul. 4, 2018

(86) PCT No.: PCT/JP2018/025391
§ 371 (c)(1),
(2) Date: Jan. 24, 2020

(87) PCT Pub. No.: WO2019/021771
PCT Pub. Date: Jan. 31, 2019

(65) Prior Publication Data
US 2020/0211548 A1    Jul. 2, 2020

(30) Foreign Application Priority Data

Jul. 24, 2017  (JP) .............................. JP2017-142958
Jul. 27, 2017  (JP) .............................. JP2017-145741
Aug. 8, 2017   (JP) .............................. JP2017-153626

(51) Int. Cl.
*G10L 15/22*    (2006.01)
*G10L 15/30*    (2013.01)
*H02J 7/00*     (2006.01)
*H04M 1/21*     (2006.01)

(52) U.S. Cl.
CPC .............. *G10L 15/22* (2013.01); *G10L 15/30* (2013.01); *H02J 7/0044* (2013.01); *H04M 1/21* (2013.01); *G10L 2015/223* (2013.01); *G10L 2015/227* (2013.01); *G10L 2015/228* (2013.01)

(58) Field of Classification Search
USPC ....................................... 704/1–504
See application file for complete search history.

(56) References Cited

U.S. PATENT DOCUMENTS

| | | | |
|---|---|---|---|
| 6,792,406 B1* | 9/2004 | Fujimura | A63F 13/825 704/260 |
| 7,212,969 B1* | 5/2007 | Bennett | H04M 3/4936 455/410 |
| 8,498,670 B2* | 7/2013 | Cha | G10L 15/22 455/418 |
| 9,077,796 B2* | 7/2015 | Gittleman | H04M 1/72409 |
| 9,711,160 B2* | 7/2017 | Krueger | G06F 1/1632 |

(Continued)

FOREIGN PATENT DOCUMENTS

| | | |
|---|---|---|
| JP | 2000-032092 A | 1/2000 |
| JP | 2000-187435 A | 7/2000 |

(Continued)

*Primary Examiner* — Marcus T Riley
(74) *Attorney, Agent, or Firm* — Studebaker & Brackett PC

(57) ABSTRACT

A charging stand includes a controller. The controller is configured to perform one of a speech operation and a voice recognition operation using contents in accordance with a location of a charging stand that supplies electric power to the mobile terminal.

6 Claims, 13 Drawing Sheets

Left-right direction

(56) References Cited

U.S. PATENT DOCUMENTS

| | | | |
|---|---|---|---|
| 2002/0137505 A1* | 9/2002 | Eiche | H04B 1/3877 455/425 |
| 2008/0255843 A1* | 10/2008 | Sun | G10L 15/142 704/250 |
| 2010/0009720 A1* | 1/2010 | Cha | G06F 1/1624 704/235 |
| 2011/0119080 A1* | 5/2011 | Hayter | G16H 20/17 705/2 |
| 2011/0286174 A1* | 11/2011 | Na | H04M 1/0274 361/679.41 |
| 2012/0046074 A1* | 2/2012 | Gittleman | H04M 1/72409 455/557 |
| 2012/0104995 A1* | 5/2012 | Woo | H02J 7/0044 320/107 |
| 2012/0324135 A1* | 12/2012 | Goodman | G06F 1/1632 710/304 |
| 2013/0219098 A1* | 8/2013 | Turnpenny | H02J 7/00034 710/303 |
| 2013/0325479 A1* | 12/2013 | Krueger | G06F 1/1632 704/275 |
| 2014/0122071 A1* | 5/2014 | Sierawski | G10L 15/26 704/235 |
| 2014/0277650 A1* | 9/2014 | Zurek | H04W 4/40 700/94 |
| 2017/0007762 A1* | 1/2017 | Hayter | A61B 5/14532 |
| 2020/0211548 A1* | 7/2020 | Yoshikawa | G06F 3/167 |

FOREIGN PATENT DOCUMENTS

| | | | | |
|---|---|---|---|---|
| JP | 2000187435 A | * | 7/2000 | ............ A63F 13/12 |
| JP | 2001-313846 A | | 11/2001 | |
| JP | 2002-057752 A | | 2/2002 | |
| JP | 2002-368858 A | | 12/2002 | |
| JP | 2003-208190 A | | 7/2003 | |
| JP | 2006-340175 A | | 12/2006 | |
| JP | 2007-4723 A | | 1/2007 | |
| JP | 2007-049562 A | | 2/2007 | |
| JP | 2007-110335 A | | 4/2007 | |
| JP | 2008-117166 A | | 5/2008 | |
| JP | 2009-071609 A | | 4/2009 | |
| JP | 2009071609 A | * | 4/2009 | |
| JP | 2011-023790 A | | 2/2011 | |
| JP | 2011023790 A | * | 2/2011 | |
| JP | 2013-511780 A | | 4/2013 | |
| JP | 2014-063219 A | | 4/2014 | |
| JP | 2014-079088 A | | 5/2014 | |
| JP | 2014-217116 A | | 11/2014 | |
| JP | 2015-109764 A | | 6/2015 | |
| JP | 2015-191448 A | | 11/2015 | |
| JP | 2015-210797 A | | 11/2015 | |
| JP | 2015-227951 A | | 12/2015 | |
| JP | 2016-071248 A | | 5/2016 | |
| JP | 2016-110654 A | | 6/2016 | |
| WO | WO-2013121653 A1 | * | 8/2013 | ........... A47L 9/0488 |

* cited by examiner

Left-right direction

CHARGING STAND, MOBILE TERMINAL, COMMUNICATION SYSTEM, METHOD, AND PROGRAM

CROSS REFERENCE TO RELATED APPLICATIONS

This application claims priority to and the benefit of Japanese Patent Applications No. 2017-142958 filed on Jul. 24, 2017, No. 2017-145741 filed on Jul. 27, 2017, and No. 2017-153626 filed on Aug. 8, 2017, the entire contents of which are incorporated herein by reference.

TECHNICAL FIELD

The present disclosure relates to a charging stand, a mobile terminal, a communication system, a method, and a program.

BACKGROUND

Mobile terminals such as smartphones, tablet PCs, and laptop computers are in widespread use. Mobile terminals utilize electric power stored in built-in batteries to operate. Mobile terminal batteries are charged by charging stands that supply electric power to a mobile terminal mounted thereon.

For the charging stands, improved charging functionality (see PTL 1), downsizing (see PTL 2), and simplified configurations (see PTL 3) have been proposed.

CITATION LIST

Patent Literature

PTL 1: JP-A-2014-217116
PTL 2: JP-A-2015-109764
PTL 3: JP-A-2014-079088

SUMMARY

A mobile terminal according to a first aspect of the present disclosure includes: a controller configured to perform at least one of a speech operation and a voice recognition operation using contents in accordance with a location of a charging stand that supplies electric power to the mobile terminal.

A charging stand according to a second aspect of the present disclosure includes:
a controller configured to perform at least one of a speech operation and a voice recognition operation using contents in accordance with a location of the charging stand.

A charging stand according to a third aspect of the present disclosure includes:
a controller configured to cause a mobile terminal to perform at least one of a speech operation and a voice recognition operation when the mobile terminal is mounted on the charging stand.

A charging stand according to a fourth aspect of the present disclosure includes:
a controller configured to perform at least one of a speech operation and a voice recognition operation when a mobile terminal is mounted on the charging stand.

A mobile terminal according to a fifth aspect of the present disclosure includes:
a controller configured to cause a charging stand to perform at least one of a speech operation and a voice recognition operation when the mobile terminal is mounted on the charging stand.

A mobile terminal according to a sixth aspect of the present disclosure includes:
a controller configured to perform at least one of a speech operation and a voice recognition operation when the mobile terminal is mounted on a charging stand.

DETAILED DESCRIPTION

Hereinafter, embodiments of the present disclosure will be described with reference to the accompanying drawings.

Figure 1:
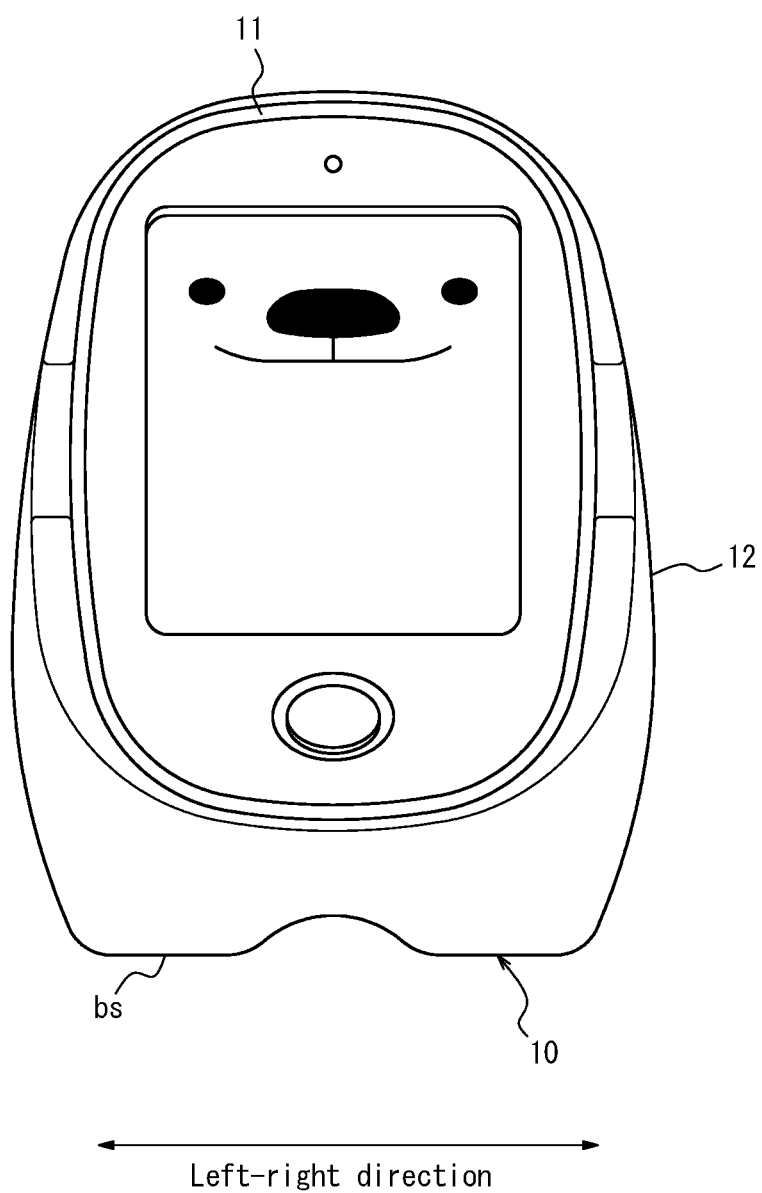
FIG. 1 is an elevation view illustrating an exterior of a communication system that includes a charging stand according to an embodiment.
Figure 2:
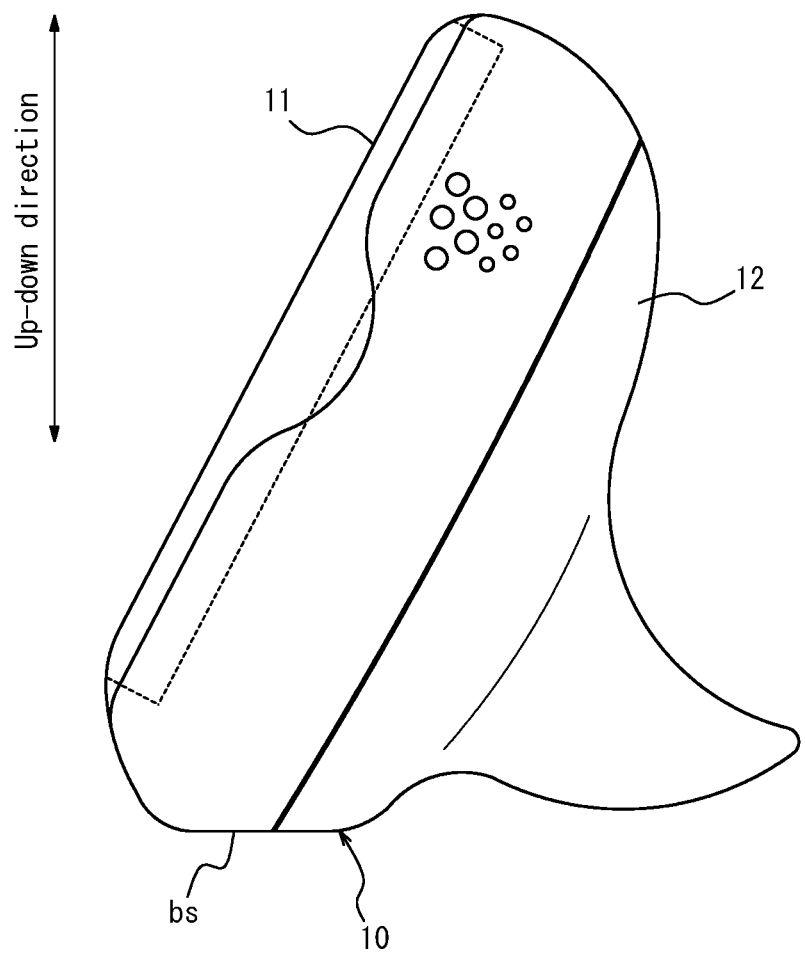
FIG. 2 is a side view of the communication system of FIG. 1.

A communication system 10 that includes a mobile terminal 11 and a charging stand 12 according to the present disclosure includes the mobile terminal 11 and the charging stand 12, as illustrated in FIG. 1 and FIG. 2. The mobile terminal 11 can be mounted on the charging stand 12. When the mobile terminal 11 is mounted on the charging stand 12, the charging stand 12 charges an internal battery of the mobile terminal 11. Also, when the mobile terminal 11 is mounted on the charging stand 12, the communication system 10 can interact with a user. The charging stand 12 has a messaging function and notifies messages for a specific user to the corresponding user.

Figure 3:
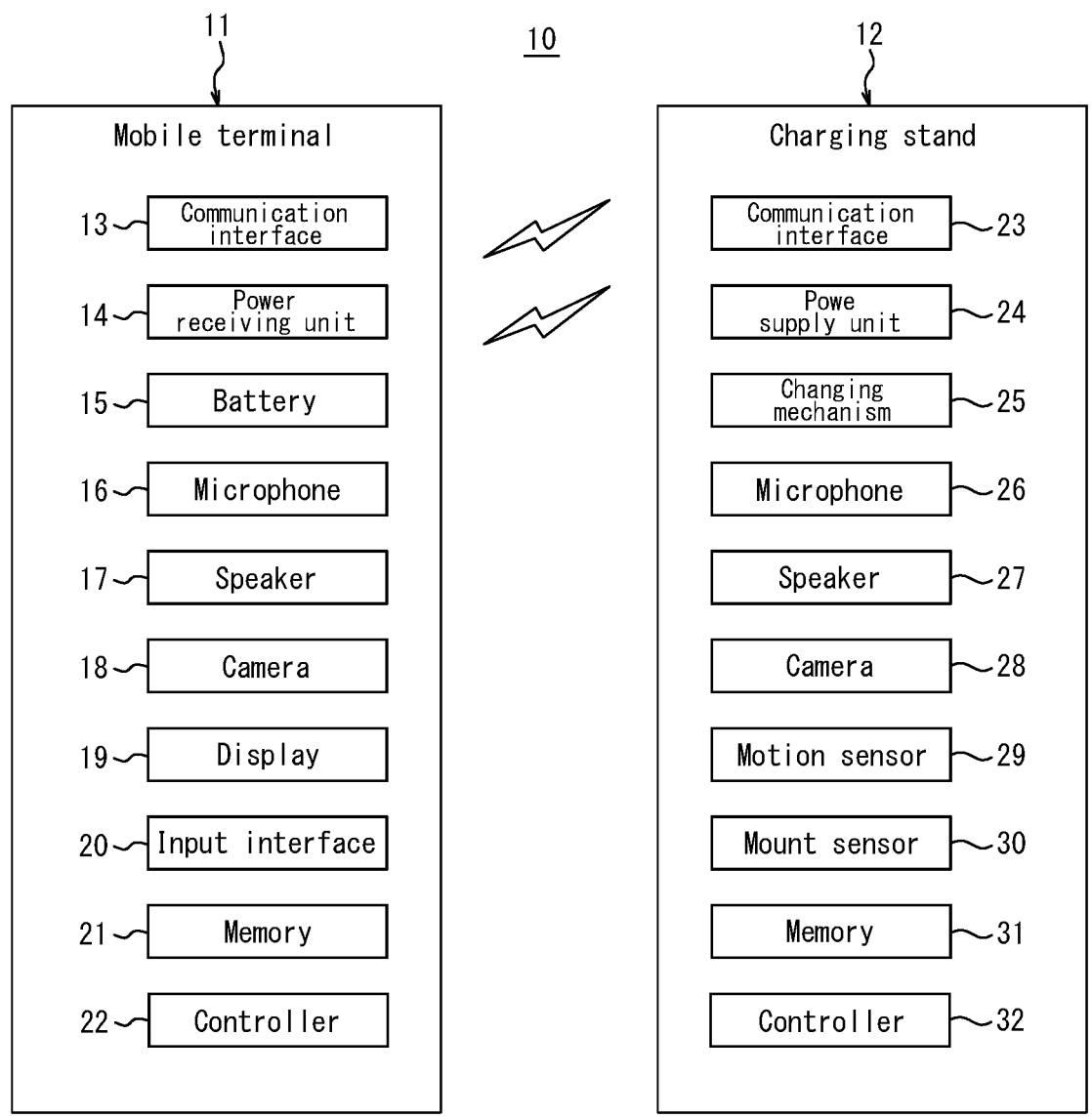
FIG. 3 is a functional block diagram schematically illustrating an internal configuration of a mobile terminal and the charging stand of FIG. 1.

The mobile terminal 11 includes a communication interface 13, a power receiving unit 14, a battery 15, a microphone 16, a speaker 17, a camera 18, a display 19, an input interface 20, a memory 21, and a controller 22, as illustrated in FIG. 3.

The communication interface 13 includes a communication interface capable of performing communication using voice, characters, or images. As used in the present disclosure, "communication interface" may encompass, for example, a physical connector, a wireless communication device, or the like. The physical connector may include an electrical connector which supports transmission of electrical signals, an optical connector which supports transmission of optical signals, or an electromagnetic connector which supports transmission of electromagnetic waves. The electrical connector may include connectors compliant with IEC60603, connectors compliant with the USB standard, connectors corresponding to an RCA pin connector, connectors corresponding to an S terminal as defined in EIAJ CP-1211A, connectors corresponding to a D terminal as defined in EIAJ RC-5237, connector compliant with HDMI® (HDMI is a registered trademark in Japan, other countries, or both), connectors corresponding to a coaxial cable including BNC (British Naval Connector), Baby-series N Connector, or the like. The optical connector may include a variety of connectors compliant with IEC 61754. The wireless communication device may include devices conforming to various standards such as Bluetooth® (Bluetooth is a registered trademark in Japan, other countries, or both) or IEEE 802.11. The wireless communication device includes at least one antenna.

The communication interface 13 communicates with an external device that is external to the mobile terminal 11 such as, for example, the charging stand 12. The communication interface 13 communicates with the external device by performing wired or wireless communication. In a configuration in which the communication interface 13 performs wired communication with the charging stand 12, the mobile terminal 11 mounted on the charging stand 12 in an appropriate orientation at an appropriate position is connected to a communication interface 23 of the charging stand 12 and can communicate therewith. The communication interface 13 may communicate with the external device in a direct manner using wireless communication or in an indirect manner using, for example, a base station and the Internet or a telephone line.

The power receiving unit 14 receives electric power supplied from the charging stand 12. The power receiving unit 14 includes, for example, a connector for receiving electric power from the charging stand 12 via a wire. Alternatively, the power receiving unit 14 includes, for example, a coil for receiving electric power from the charging stand 12 using a wireless feeding method such as an electromagnetic induction method or a magnetic field resonance method. The power receiving unit 14 charges the battery 15 with the received electric power.

The battery 15 stores electric power supplied from the power receiving unit 14. The battery 15 discharges electric power and thus supplies electric power necessary for constituent elements of the mobile terminal 11 to execute the respective functions.

The microphone 16 detects a voice originating in the vicinity of the mobile terminal 11 and converts the voice into an electrical signal. The microphone 16 outputs the detected voice to the controller 22.

The speaker 17 outputs a voice based on the control by the controller 22. For example, when the speaker 17 performs a speech function, which will be described below, the speaker 17 outputs speech determined by the controller 22. For example, when the speaker 17 performs a call function with another mobile terminal, the speaker 17 outputs a voice acquired from the another mobile terminal.

The camera 18 captures an image of a subject located in an imaging range. The camera 18 can capture both a still image and a video image. When capturing a video image, the camera 18 successively captures images of a subject at a speed of, for example, 60 fps. The camera 18 outputs the captured images to the controller 22.

The display 19 is configured as, for example, a liquid crystal display (LCD), an organic EL (Electroluminescent) display, or an inorganic EL display. The display 19 displays an image based on the control by the controller 22.

The input interface 20 is configured as, for example, a touch panel integrated with the display 19. The input interface 20 detects various requests or information associated with the mobile terminal 11 input by the user. The input interface 20 outputs a detected input to the controller 22.

The memory 21 may be configured as, for example, a semiconductor memory, a magnetic memory, an optical memory, or the like. The memory 21 stores, for example, various information necessary for the execution of a registration operation, a speech operation, a voice recognition operation, a watching operation, a data communication operation, a telephone call operation, or the like, which will be described later. The memory 21 also stores an image of the user, user information, an installation location of the charging stand 12, external information, contents of conversations, a behavior history, local information, a specific target of the watching operation, or the like acquired by the controller 22 during the operations set forth above.

The controller 22 includes one or more processors. The controller 22 may include one or more memories for storing programs and information being calculated for use in various operations. The memory includes a volatile memory or a nonvolatile memory. The memory includes a memory independent of the processor or a built-in memory of the processor. The processor includes a general purpose processor configured to read a specific program and perform a specific function, or a specialized processor dedicated for specific processing. The specialized processor includes an application specific application specific integrated circuit (ASIC). The processor includes a programmable logic device (PLD). The PLD includes field-programmable gate array (FPGA). The controller 22 may be configured as a system on a chip (SoC) or a system in a package (SiP), in which one or more processors cooperate.

For example, when the controller 22 receives an instruction from the charging stand 12 to transition to a communication mode as will be described later, the controller 22 controls each constituent element of the mobile terminal 11 to execute various functions of the communication mode. The communication mode is a mode of the communication system 10 constituted by the mobile terminal 11 and the charging stand 12 which causes execution of an interaction with a specific user, observation of the specific user, sending a message to the specific user, or the like.

The controller 22 performs a registration operation for registering a user which executes the communication mode. For example, the controller 22 starts the registration operation upon detection of an input that requires user registration and is made in respect to the input interface 20.

For example, in the registration operation, the controller 22 issues a message instructing the user to look at a lens of the camera 18, and then captures an image of the user's face by activating the camera 18. Further, the controller 22 stores the captured image in association with user information including the name and attributes of the user. The attributes include, for example, the name of the owner of the mobile terminal 11, the relation of the user to the owner, gender, age bracket, height, weight, and the like. The controller 22 acquires the user information input to the input interface 20 by the user.

In the registration operation, the controller 22 transfers a registered image together with the user information associated therewith to the charging stand 12. To do so, the controller 22 determines whether the controller 22 can communicate with the mobile terminal 11.

In a case in which the controller 22 cannot communicate with the charging stand 12, the controller 22 displays a message for enabling communication on the display 19. For example, when the mobile terminal 11 and the charging stand 12 are not connected to each other in a configuration in which the mobile terminal 11 and the charging stand 12 perform wired communication, the controller 22 displays a message requesting connection on the display 19. In a case in which the mobile terminal 11 and the charging stand 12 are located remotely from each other and cannot communicate with each other in a configuration in which the mobile terminal 11 and the charging stand 12 perform wireless communication, the controller 22 displays a message requesting to approach the charging stand 12 on the display 19.

When the mobile terminal 11 and the charging stand 12 can communicate with each other, the controller 22 causes the mobile terminal 11 to transfer the registered image and the user information to the charging stand 12 and display an indication indicating that the transfer is in progress on the display 19. When the controller 22 acquires a notification of completion of transfer from the charging stand 12, the controller 22 causes the display 19 to display a message indicating that the initial setting has been completed.

When the communication system 10 is in transition to the communication mode, the controller 22 causes the communication system 10 to interact with a specific user by performing at least one of the speech operation and the voice recognition operation.

In the speech operation, the controller 22 determines contents of a speech based on current time, location of the charging stand 12, whether the mobile terminal 11 is mounted on the charging stand 12, an attribute of a user targeted for the interaction, the user targeted for the interaction, external information acquired by the communication interface 13, an action of the user targeted for interaction, an email or a phone call received by the mobile terminal 11, a note or a schedule registered to the mobile terminal 11, a voice of the user, and contents of past conversations by the user. A location of the charging stand 12, whether the mobile terminal 11 is mounted on the charging stand 12, the attributes of the user targeted for interaction, and the external information will be described later. The controller 22 drives the speaker 17 to output the determined contents using a voice.

The controller 22 determines the location of the charging stand 12 in order to determine the contents of the speech. The controller 22 determines the location of the charging stand 12 based on a notification regarding the location acquired from the charging stand 12 via the communication interface 13. Alternatively, the controller 22 may determine the location of the charging stand 12 based on at least one of a sound detected by the microphone 16 and an image detected by the camera 18.

For example, when the installation location of the charging stand 12 is at an entrance hall, the controller 22 determines appropriate words corresponding to when the user is going out or coming home as the contents of the speech. For example, when the installation location of the charging stand 12 is on a dining table, the controller 22 determines appropriate words corresponding to behaviors performed at the dining table such as dining or cooking as the contents of the speech. For example, when the installation location of the charging stand 12 is in a child room, the controller 22 determines appropriate words such as a child topic or words calling for the attention of the child as the contents of the speech. For example, when the installation location of the charging stand 12 is in a bedroom, the controller 22 determines appropriate words suitable at bedtime or morning as the contents of the speech.

The controller 22 determines whether the mobile terminal 11 is mounted on the charging stand 12 or removed from the charging stand 12, in order to determine the contents of the speech. The controller 22 determines whether the mobile terminal 11 is mounted or removed, based on a mounting notification acquired from the charging stand 12. For example, while a notification indicating that the mobile terminal 11 is mounted on the charging stand 12 is being received from the charging stand 12, the controller 22 determines that the mobile terminal 11 is mounted on the charging stand 12. When the controller 22 stops receiving the notification, the controller 22 determines that the mobile terminal 11 is removed from the charging stand 12. Alternatively, the controller 22 may determine whether the mobile terminal 11 is mounted on the charging stand 12, based on whether the power receiving unit 14 can receive electric power from the charging stand 12, or whether the communication interface 13 can communicate with the charging stand 12.

When the mobile terminal 11 is mounted on the charging stand 12, the controller 22 determines words suitable for a user who is entering the installation location of the charging stand 12 as the contents of the speech. Also, when the mobile terminal 11 is removed from the charging stand 12, the controller 22 determines words suitable for a user leaving the installation location of the charging stand 12 as contents of the speech.

The controller 22 determines a behavior of a user targeted for interaction, in order to determine the contents of the speech. For example, when the controller 22 determines that the charging stand 12 is located at the entrance hall, the controller 22 determines whether the user targeted for interaction is leaving home or coming home, based on an image acquired from the charging stand 12 or an image acquired from the camera 18. Alternatively, the controller 22 may determine whether the user targeted for interaction is leaving home or coming home, based on an image detected by the camera 18 or the like. The controller 22 determines appropriate words as the contents of the speech, in consideration of a combination of whether the mobile terminal 11 is mounted on the charging stand 12 and whether the user is leaving home or coming home.

The controller 22 determines an attribute of the user targeted for interaction, in order to determine the contents of the speech, as described above. The controller 22 determines the attribute of the user targeted for interaction based on a notification of the user targeted for interaction received from the charging stand 12 and the user information stored in the memory 21. Alternatively, the controller 22 may determine the user targeted for interaction or the attribute of the user targeted for interaction based on at least one of a voice detected by the microphone 16 and an image detected by the camera 18. The controller 22 determines appropriate words suitable for the gender or the age bracket of the user targeted for interaction as the contents of the speech.

In order to determine the contents of the speech, the controller 22 activates the communication interface 13 and acquires external information such as a weather forecast or traffic conditions. Base on the acquired external information, the controller 22 determines words for calling attention to the weather or the congestion status of the transportation to be used by the user as the contents of the speech.

In the voice recognition operation, the controller 22 recognizes the contents spoken by the user by performing morphological analysis of a voice detected by the microphone 16 in accordance with the location of the charging stand 12. The controller 22 performs a predetermined operation based on the recognized contents. The predetermined operation may include, for example, a speech operation on the recognized contents as described above, search for desired information, display of a desired image, or making a telephone call or sending email to an intended addressee.

While the communication system 10 is in transition to the communication mode, the controller 22 stores the continuously performed speech operation and voice recognition operation described above in the memory 21 and learns contents of conversations associated with the specific user targeted for interaction. The controller 22 utilizes the learned contents of the conversations to determine the contents of later speech. The controller 22 may transfer the learned contents of conversations to the charging stand 12.

Also, when the communication system 10 is in transition to the communication mode, the controller 22 learns a behavior history of a specific user targeted for interaction from contents of a conversation with the user and an image captured by the camera 18 during a speech to the user. The controller 22 informs the user of advice based on the learned history of the user. Advice may be provided as speech via the speaker 17 or an image displayed on the display 19. Such advice may include, for example, notification of a time to take a medicine, a suggestion for a meal that matches preference of the user, a suggestion for a healthy diet for the user, a suggestion for an effective exercise the user can continue, or the like. The controller 22 notifies the charging stand 12 of the learned behavior history in association with the user.

Further, when the communication system 10 is in transition to the communication mode, the controller 22 detects the current location of the mobile terminal 11. Detection of the current location is based on, for example, an installation location of a base station in communication with or the GPS incorporated in the mobile terminal 11. The controller 22 notifies the user of local information associated with the detected current location. The notification of the local information may be generated as speech by the speaker 17 or an image displayed on the display 19. The local information may include, for example, sale information for a neighborhood store.

When the input interface 20 detects a request for starting the watching operation associated with a specific target while the communication system 10 is in transition to the communication mode, the controller 22 notifies the charging stand 12 of the request. The specific target may be, for example, a specific registered user, a room in which the charging stand 12 is located, or the like.

The watching operation is performed by the charging stand 12, regardless of whether or not the mobile terminal 11 is mounted on the charging stand 12. When the controller 22 receives a notification from the charging stand 12 indicating that the specific target is in an abnormal state that is performing the watching operation, the controller 22 notifies the user to that effect. The notification to the user may be generated as voice via the speaker 17 or as a warning image displayed on the display 19.

The controller 22 performs a data communication operation to send/receive email or display an image using a browser, or perform a telephone call operation, based on an input to the input interface 20, regardless of whether the communication system 10 is in transition to the communication mode.

The charging stand 12 includes a communication interface 23, a power supply unit 24, a changing mechanism 25, a microphone 26, a speaker 27, a camera 28, a motion sensor 29, a mount sensor 30, a memory 31, a controller 32, and the like.

The communication interface 23 includes a communication interface capable of performing communication using voice, characters, images, in a manner similar to the communication interface 13 of the mobile terminal 11. The communication interface 23 communicates with the mobile terminal 11 by performing wired or wireless communication. The communication interface 23 may communicate with an external device by performing wired communication or wireless communication.

The power supply unit 24 supplies electric power to the power receiving unit 14 of the mobile terminal 11 mounted on the charging stand 12. The power supply unit 24 supplies electric power to the power receiving unit 14 in a wired or wireless manner, as described above.

The changing mechanism 25 changes an orientation of the mobile terminal 11 mounted on the charging stand 12. The changing mechanism 25 can change the orientation of the mobile terminal 11 along at least one of the vertical direction and the horizontal direction that are defined with respect to a bottom surface bs (see FIGS. 1 and 2), which is defined with respect to the charging stand 12. The changing mechanism 25 includes a built-in motor and changes the orientation of the mobile terminal 11 by driving the motor.

The microphone 26 detects a voice around the charging stand 12 and converts it into an electrical signal. The microphone 26 outputs the detected voice to the controller 32.

The speaker 27 outputs voice based on the control by the controller 32.

The camera 28 captures a subject located within an imaging range. The camera 28 can capture both a still image and a video image. When capturing a video image, the camera 28 successively captures the subject at a speed of, for example, 60 fps. The camera 28 outputs the captured image to the controller 32.

The motion sensor 29 is configured as, for example, an infrared sensor and detects the presence of a person around the charging stand 12 by detecting heat. When the motion sensor 29 detects the presence of a person, the motion sensor 29 notifies the controller 32 to that effect. Note that the motion sensor 29 may be configured as a sensor other than the infrared sensor such as, for example, an ultrasonic sensor. Alternatively, the motion sensor 29 may cause the camera 28 to detect the presence of a person based on a change in images continuously captured.

The mount sensor 30 of the charging stand 12 is arranged on, for example, a mounting surface for mounting the mobile terminal 11 and detects the presence or absence of the mobile terminal 11. The mount sensor 30 is configured as, for example, a piezoelectric element or the like. When the mobile terminal 11 is mounted, the mount sensor 30 notifies the controller 32 to that effect.

The memory 31 may be configured as, for example, a semiconductor memory, a magnetic memory, an optical memory, or the like. For example, in order to determine the installation location of the charging stand 12, the memory 31 stores at least one of a sound and an image unique to each conceivable installation location. For example, the memory 31 stores the installation location determined by the controller 32. For example, the memory 31 stores an image or user information associated with a registered user acquired from the mobile terminal 11 for each mobile terminal 11 and each registered user. For example, the memory 31 stores contents of a conversation for each user acquired from the mobile terminal 11. For example, the memory 31 stores information for driving the changing mechanism 25 based on an imaging result acquired by the camera 28, as will be described later. For example, the memory 31 stores a behavior history acquired from the mobile terminal 11 for each user.

The controller 32 includes one or more processors, in a manner similar to the controller 22 of the mobile terminal 11. The controller 32 may include one or more memories for storing programs and information being calculated to be used for various operations, in a manner similar to the controller 22 of the mobile terminal 11.

When the charging stand 12 receives electric power from, for example, a grid, the controller 32 determines a location of the charging stand 12 based on at least one of a voice detected by the microphone 26 and an image detected by the camera 28. The controller 32 determines the installation location by, for example, acquiring a characteristic conversation pattern or a sound unique to each of a plurality of conceivable locations from the memory 31 or the like and comparing them with contents of conversations by a plurality of users or a sound detected by the microphone 26. For example, the controller 32 determines the installation location by acquiring a characteristic outline of an object unique to each of a plurality of conceivable installation locations from the memory 31 or the like and comparing them with an outline included in an image detected by the camera 28. The controller 32 notifies the mobile terminal 11 mounted on the charging stand 12 of the location.

The controller 32 causes the communication system 10 to maintain the communication mode at least from when the mount sensor 30 detects the mounting of the mobile terminal 11 to when the mount sensor 30 detects the removal of the mobile terminal 11, or until a predetermined period of time has elapsed after the detection of the removal. Thus, while the mobile terminal 11 is mounted on the charging stand 12, the controller 32 can cause the mobile terminal 11 to perform at least one of the speech operation and the voice recognition operation. The controller 32 can cause the mobile terminal 11 to perform at least one of the speech operation and the voice recognition operation until the predetermined period has elapsed after the removal of the mobile terminal 11 from the charging stand 12.

The controller 32 activates the camera 28 to capture an image of the surroundings while the mobile terminal 11 is mounted on the charging stand 12. The controller 32 detects a human face in a captured image. The controller 32 identifies the captured user by comparing a detected image of the human face with images of faces stored in the memory 31. The controller 32 notifies the mobile terminal 11 of the identified user.

After identifying the captured user, the controller 32 causes the camera 28 to maintain imaging and searches for the user's face in each image. The controller 32 drives the changing mechanism 25 such that the display 19 of the mobile terminal 11 is directed to the user based on a location of the face searched in the images.

When the mount sensor 30 detects the mounting of the mobile terminal 11, the controller 32 starts the transition of the communication system 10 to the communication mode. Thus, when the mobile terminal 11 is mounted on the charging stand 12, the controller 32 causes the mobile terminal 11 to start execution of at least one of the speech operation and the voice recognition operation. Also, when the mount sensor 30 detects the mounting of the mobile terminal 11, the controller 32 notifies the mobile terminal 11 that the mobile terminal 11 is mounted on the charging stand 12.

The controller 32 may add detection of a person by the motion sensor 29 to a condition to start at least one of the speech operation and the voice recognition operation. For example, when the motion sensor 29 detects the presence of a person after detecting that the mobile terminal 11 is mounted on the charging stand 12, the controller 32 may start the speech operation or the voice recognition operation.

When the mount sensor 30 detects removal of the mobile terminal 11 or when a predetermined time has elapsed after the mount sensor 30 detects the mounting of the mobile terminal 11, the controller 32 ends the communication mode of the communication system 10. Thus, when the mobile terminal 11 is removed, or when the predetermined time has elapsed after the mount sensor 30 detects the mounting of the mobile terminal 11, the controller 32 causes the mobile terminal 11 to end the execution of at least one of the speech operation and the voice recognition operation.

When the controller 32 acquires contents of a conversation for each user from the mobile terminal 11, the controller 32 causes the memory 31 to store the contents of the conversation for each mobile terminal 11. The controller 32 causes different mobile terminals 11 which directly or indirectly communicate with the charging stand 12 to share the contents of the conversation, as appropriate. Note that the indirect communication with the charging stand 12 includes at least one of communication via a telephone line when the charging stand 12 is connected to the telephone line and communication via the mobile terminal 11 mounted on the charging stand 12.

When the controller 32 acquires an instruction to perform the watching operation from the mobile terminal 11, the controller 32 performs the watching operation. In the watching operation, the controller 32 activates the camera 28 to sequentially capture a specific target. The controller 32 extracts the specific target in the images captured by the camera 28. The controller 32 determines a state of the extracted specific target based on image recognition or the like. The state of the specific target includes, for example, an abnormal state in which the specific user falls down and does not get up or a detection of a moving object in a vacant home. When the controller 32 determines that the specific target is in an abnormal state, the controller 32 notifies the mobile terminal 11 having issued the instruction to perform the watching operation that the specific target is in an abnormal state.

When the mobile terminal 11 is removed, the controller 32 causes the speaker 27 to inquire whether there is a message to the user. The controller 32 performs the voice recognition operation on a voice detected by the microphone 26 and determines whether the voice is a message. Note that the controller 32 can determine whether the voice detected by the microphone 26 is a message without inquiring whether there is a message. When the voice detected by the microphone 26 is a message, the controller 32 stores the message in the memory 31.

The controller 32 determines whether the voice determined to be a message specifies an addressed user. When a user is not specifies, the controller 32 outputs a request to specify an addressed user. The request may be output as, for example, voice via the speaker 27. The controller 32 performs the voice recognition operation and recognizes the addressed user.

The controller 32 reads attributes of the addressed user from the memory 31. When the user is the owner of the mobile terminal 11 stored in the memory 31 according to the attributes of the user read out from the memory 31, the controller 32 waits until the mobile terminal 11 is mounted on the mount sensor 30. When the mount sensor 30 detects the mounting of the mobile terminal 11, the controller 32 causes the communication interface 23 to determine whether the owner of the mobile terminal 11 is the addressed user. When the owner of the mobile terminal 11 mounted on the mount sensor 30 is the addressed user, the controller 32 causes output of the message stored in the memory 31. The message may be output as, for example, voice via the speaker 27.

When the controller 32 does not detect the mounting of the mobile terminal 11 until when a first period has elapsed after acquiring the message, the controller 32 transmits the message to the mobile terminal 11 owned by the addressed user. The controller 32 may transmit the message in the form of audio data or data in letters. The first period is, for example, a time considered to be a message retention period and determined at the time of manufacture based on statistical data or the like.

When the user is not the owner of the mobile terminal 11 according to the attributes of the user read out from the memory 31, the controller 32 activates the camera 28 and starts the determination whether the user's face is included in a captured image. When the user's face is included in an image, the controller 32 causes the memory 31 to output the message stored therein.

Further, the controller 32 analyzes the contents of the stored message. The controller 32 determines whether conversations corresponding to the contents of the message are stored in the memory 31. The conversations corresponding to the contents of the message are determined in advance with respect to messages that are presumed to be generated or performed for a specific user at a particular time and stored in the memory 31. The conversations may include, for example, "Coming home now" corresponding to "See you later", "Have you taken the pill?" corresponding to "Take the pill", "Have you washed your hands?" corresponding to "Wash your hands", "Have you set the alarm?" corresponding to "Go to bed early", and "Have you brushed your teeth?" corresponding to "Brush your teeth".

Some of the conversations corresponding to the contents of the messages are associated with the installation location of the charging stand 12. For example, a message to be generated in a bedroom such as "Have you set the alarm?" corresponding to "Go to bed early" is selected only when the installation location of the charging stand 12 is in a bedroom.

When the conversations corresponding to the contents of the messages are stored, the controller 32 identifies the specific user related to the occurrence or execution of the matter related to the message. The controller 32 analyzes a behavior history of the specific user and estimates a timing to generate or perform the matter related to the message.

For example, regarding the message "See you later", the controller 32 analyzes a period from when the message is input to when the user comes home, based on the behavior history of the addressed user, and determines an elapse of the time. Also, regarding the message "Take the pills", the controller 32 estimates a time when a user should take the pills, based on a behavior history of the addressed user. Regarding the message "Wash your hands", the controller 32 estimates when a next meal starts, based on the behavior history of the addressed user. Regarding the message "Go to bed early", for example, the controller 32 estimates the time to go bed, based on the behavior history of the addressed user. Regarding the message "Brush your teeth", for example, the controller 32 estimates a finishing time of the next meal and a bed time, based on the behavior history of the addressed user.

The controller 32 activates the camera 28 at an estimated time and starts the determination whether the face of the specific user is included in a captured image. When the face of the specific user is included, the controller 32 outputs speech related to a message. The speech may be output as, for example, voice from the speaker 27.

When the addressed user of the message is the owner of the mobile terminal 11 and, simultaneously, a second period has elapsed from the estimated time, the controller 32 transmits the speech related to the contents of the message. The controller 32 may transmit the speech in the form of audio data or data in letters. The second period is, for example, a duration from the estimated time to a time at which the matter related to the message should be securely occurred or performed, and determined at the time of manufacture based on statistical data or the like.

Figure 4:
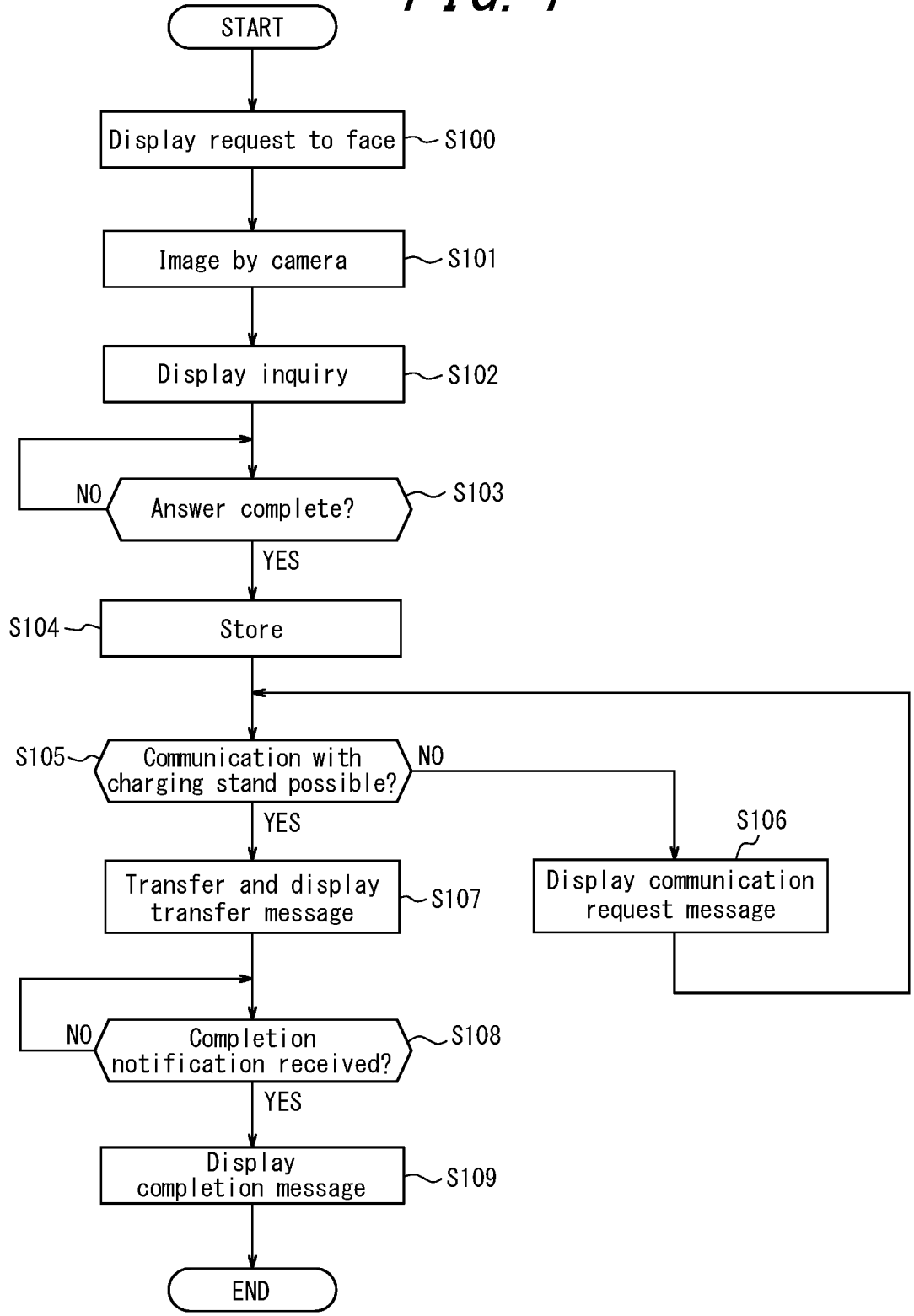
FIG. 4 is a flowchart illustrating an initial setting operation performed by a controller of the mobile terminal illustrated in FIG. 3.

Next, an initial setting operation performed by the controller 22 of the mobile terminal 11 according to the present disclosure will be described with reference to the flowchart of FIG. 4. The initial setting operation starts when the input interface 20 detects a user input for starting the initial setting.

In step S100, the controller 22 displays a message requesting to face the camera 18 of the mobile terminal 11 on the display 19. After the message is displayed on the display 19, the process proceeds to step S101.

The controller 22 causes the camera 18 to capture an image in step S101. After an image is captured, the process proceeds to step S102.

The controller 22 displays an inquiry concerning the name and the attributes of the user on the display 19 in step S102. After the inquiry is displayed, the process proceeds to step S103.

In step S103, the controller 22 determines whether there is an answer to the inquiry of step S102. When there is no answer, the process repeats step S103. When there is an answer, the process proceeds to step S104.

In step S104, the controller 22 associates the image of the face captured in step S102 with the answer to the inquiry detected in step S103 as user information and stores them in the memory 21. After the storing, the process proceeds to step S105.

The controller 22 determines whether the controller 22 can communicate with the charging stand 12 in step S105. When the controller 22 cannot communicate with the charging stand 12, the process proceeds to step S106. When the controller 22 can communicate with the charging stand 12, the process proceeds to step S107.

In step S106, the controller 22 displays a message requesting for an action that enables communication with the charging stand 12 on the display 19. The message requesting for an action that enables communication may be, for example, "Mount the mobile terminal on the charging stand" in the configuration in which the mobile terminal 11 and the charging stand 12 perform wired communication. The message requesting for an action that enables communication may be, for example, "Move the mobile terminal close to the charging stand" in the configuration in which the mobile terminal 11 and the charging stand 12 perform wireless communication. After the message is displayed, the process returns to step S105.

In step S107, the controller 22 transfers the image of the face stored in step S104 and the user information to the charging stand 12. Also, the controller 22 displays a message indicating that the transfer is in progress on the display 19. After the start of the transfer, the process proceeds to step S108.

The controller 22 determines whether a completion notification of transfer is received from the charging stand 12 in step S108. When the completion notification is not received, the process repeats step S108. When the completion notification is received, the process proceeds to step S109.

The controller 22 displays an initial setting completion message of on the display 19 in step S109. After the initial setting completion message is displayed, the initial setting operation ends.

Figure 5:
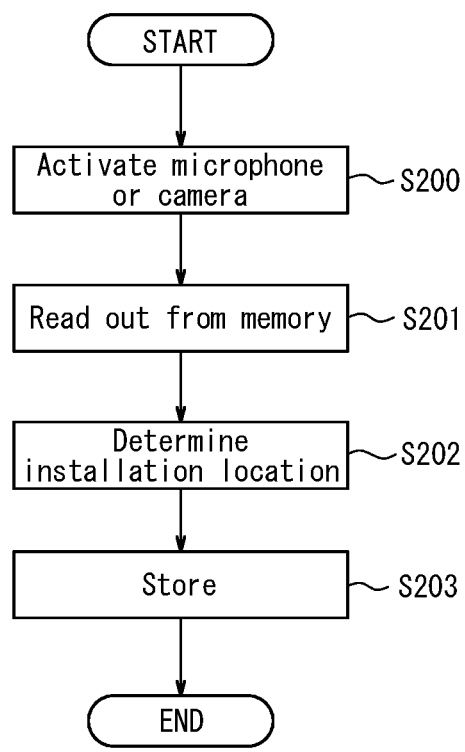
FIG. 5 is a flowchart illustrating an installation location determination operation performed by a controller of the charging stand illustrated in FIG. 3.

Next, an installation location determination operation performed by the controller 32 of the charging stand 12 according to the present disclosure will be described with reference to the flowchart of FIG. 5. The installation location determination operation starts when, for example, a predetermined time has elapsed after the power source of the charging stand 12 is turned on.

The controller 32 drives at least one of the microphone 26 and the camera 28 in step S200. After the driving, the process proceeds to step S201.

In step S201, the controller 32 reads out at least one of a voice or an image unique to each conceivable installation location from the memory 31 to be used for the determination of the installation location. After reading the voice or image, the process proceeds to step S202.

In step S202, the controller 32 compares at least one of the voice detected by the microphone 26 or the image detected by the camera 28, which is activated in step S200, with at least one of the voice or the image read out from the memory 31 in step S201. The controller 32 determines the installation location of the charging stand 12 based on the comparison. After the determination, the process proceeds to step S203.

In step S203, the controller 32 stores the installation location of the charging stand 12 determined in step S202 in the memory 31. After the storing, the installation location determination operation ends.

Figure 6:
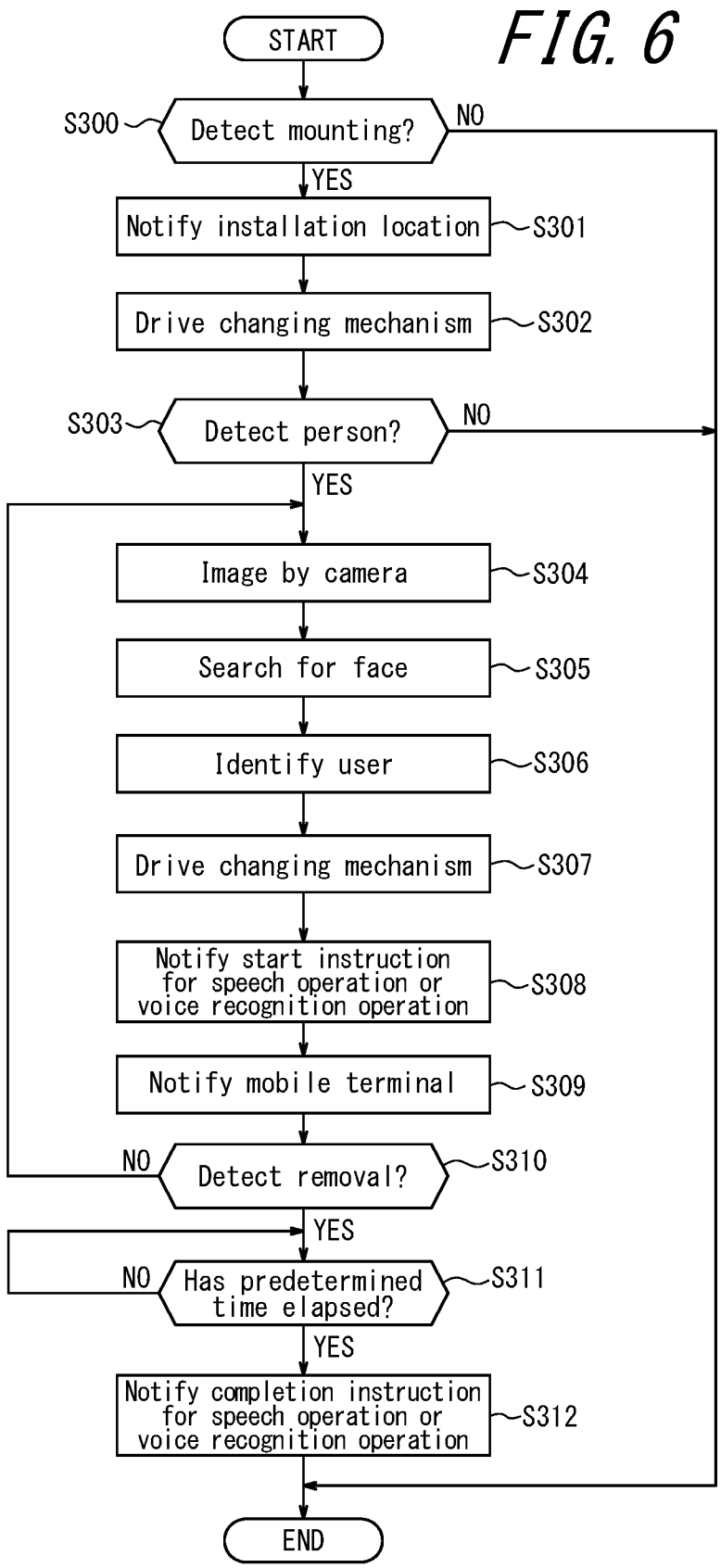
FIG. 6 is a flowchart illustrating a speech execution determination operation performed by the controller of the charging stand illustrated in FIG. 3.

Next, a speech execution determination operation performed by the controller 32 of the charging stand 12 according to the present disclosure will be described with reference to the flowchart of FIG. 6. The speech execution determination operation starts periodically.

In step S300, the controller 32 determines whether the mount sensor 30 is detecting the mounting of the mobile terminal 11. When the mount sensor 30 is detecting the mounting, the process proceeds to step S301. When the mount sensor 30 is not detecting the mounting, the speech execution determination operation ends.

In step S301, the controller 32 reads out the installation location of the charging stand 12 from the memory 31 and notifies the mobile terminal 11 of the installation location. After the notification, the process proceeds to step S302.

In step S302, the controller 32 drives the changing mechanism 25 and the motion sensor 29 to detect the presence or absence of a person in the vicinity of the charging stand 12. After the changing mechanism 25 and the motion sensor 29 are driven, the process proceeds to step S303.

In step S303, the controller 32 determines whether the motion sensor 29 is detecting a person in the vicinity of the charging stand 12. When a person is detected, the process proceeds to step S304. When a person is not detected, the speech execution determination operation ends.

The controller 32 causes the camera 28 to capture an image of the surroundings in step S304. After the image is captured, the process proceeds to step S305.

In step S305, the controller 32 searches for a face of the person included in the image captured in step S304. Further, the controller 32 detects a location of the searched face within the image. After the search for the face, the process proceeds to step S306.

In step S306, the controller 32 compares the face searched in step S305 with an image of a registered face stored in the memory 31 and thus identifies the captured user. After the identification, the process proceeds to step S307.

In step S307, the controller 32 drives the changing mechanism 25 such that the display 19 of the mobile terminal 11 is directed to the direction of the user's face captured in step S304 based on the location of the face searched in step S305. After the changing mechanism 25 is driven, the process proceeds to step S308.

In step S308, the controller 32 notifies the mobile terminal 11 of an instruction to start at least one of the speech operation and the voice recognition operation. After notifying the mobile terminal 11, the process proceeds to step S309.

In step S309, the controller 32 notifies the mobile terminal 11 of the user identified in step S306. After the notification, the process proceeds to step S310.

In step S310, the controller 32 determines whether the mount sensor 30 detects removal of the mobile terminal 11. When the mount sensor 30 does not detect the removal, the process returns to step S304. When the mount sensor 30 detects the removal, the process proceeds to step S311.

In step S311, the controller 32 determines whether a predetermined time has elapsed after the detection of the removal. When the predetermined time has not elapsed, the process returns to step S310. When the predetermined time has elapsed, the process proceeds to step S312. Note that step S311 is omitted in a configuration in which the communication mode ends when the mount sensor 30 detects the removal of the mobile terminal 11.

In step S313, the controller 32 notifies the mobile terminal 11 of an instruction to end at least one of the speech operation and the voice recognition operation. Also, the controller 32 causes the speaker 27 to inquire whether there is a message. After the notification to the mobile terminal 11, the speech execution determination operation ends.

Figure 7:
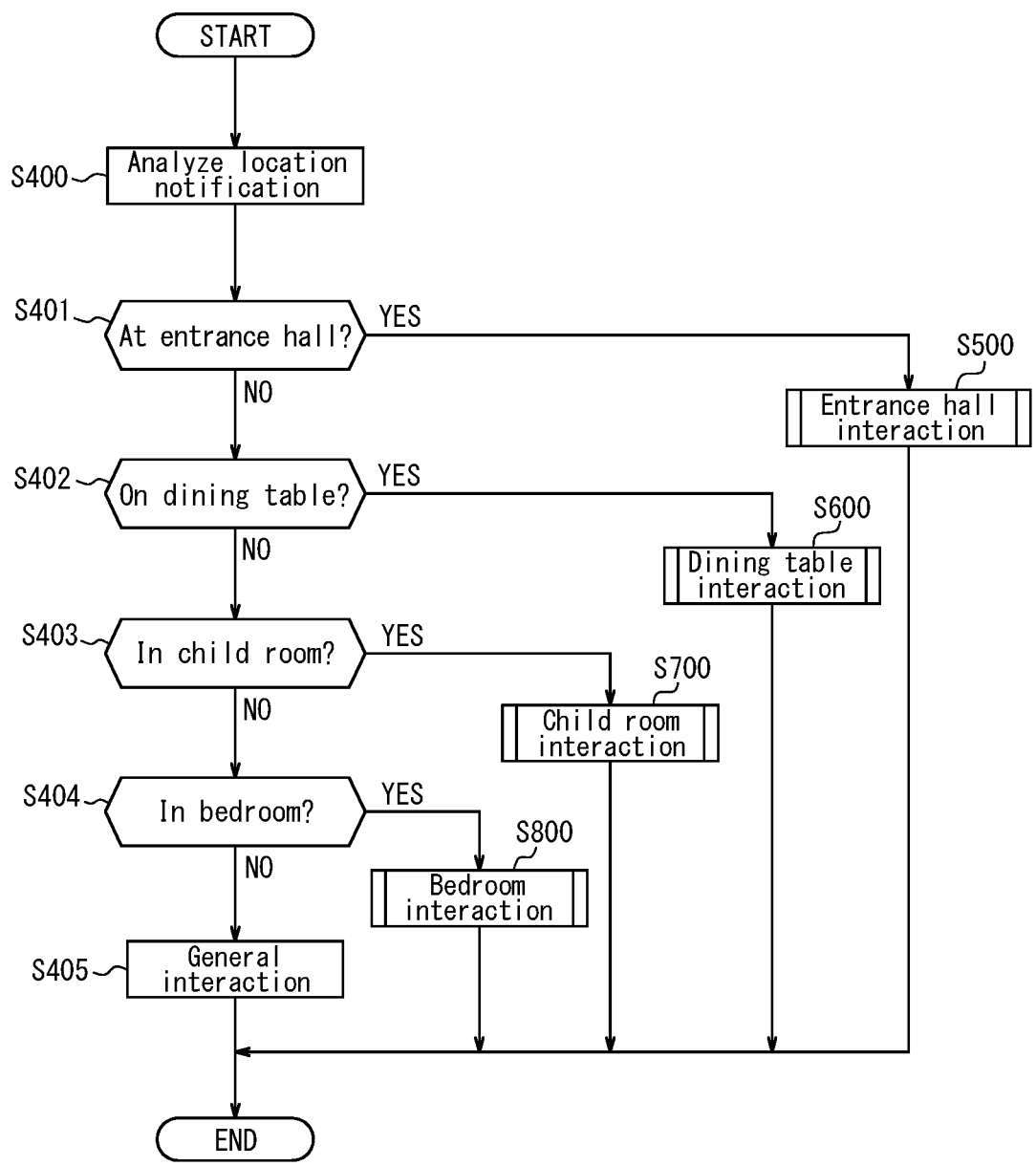
FIG. 7 is a flowchart illustrating a location determination operation performed by the controller of the mobile terminal illustrated in FIG. 3.

Next, a location determination operation performed by the controller 22 of the mobile terminal 11 according to the present disclosure will be described with reference to the flowchart of FIG. 7. The location determination operation starts when the mobile terminal 11 is mounted on the charging stand 12.

The controller 22 analyzes an installation location acquired from the charging stand 12 in step S400. After the analysis, the process proceeds to step S401.

In step S401, the controller 22 determines whether the installation location of the charging stand 12 analyzed in step S400 is at the entrance hall. When the installation location is at the entrance hall, the process proceeds to step S500. When the installation location is not at the entrance hall, the process proceeds to step S402.

In step S500, the controller 22 performs an entrance hall interaction subroutine, which will be described later. After the entrance hall interaction subroutine is performed, the location determination operation ends.

In step S402, the controller 22 determines whether the installation location of the charging stand 12 analyzed in step S400 is on a dining table. When the installation location is on the dining table, the process proceeds to step S600. When the installation location is not on the dining table, the process proceeds to step S403.

In step S600, the controller 22 performs a dining table interaction subroutine, which will be described later. After the dining table interaction subroutine is performed, the location determination operation ends.

In step S403, the controller 22 determines whether the installation location of the charging stand 12 analyzed in step S400 is in a child room. When the installation location is in the child room, the process proceeds to step S700. When the installation location is not in the child room, the process proceeds to step S404.

In step S700, the controller 22 performs a child room interaction subroutine, which will be described later. After the child room interaction subroutine is performed, the location determination operation ends.

In step S404, the controller 22 determines whether the installation location of the charging stand 12 analyzed in step S400 is in a bedroom. When the installation location is in a bedroom, the process proceeds to step S800. When the installation location is not in a bedroom, the process proceeds to step S405.

In step S800, the controller 22 performs a bedroom interaction subroutine, which will be described later. After the bedroom interaction subroutine is performed, the location determination operation ends.

In step S405, the controller 22 performs the speech operation and the voice recognition operation using general speech which does not concern the installation location to determine the contents of speech. After the speech operation and the voice recognition operation using the general speech are performed, the location determination operation ends.

Figure 8:
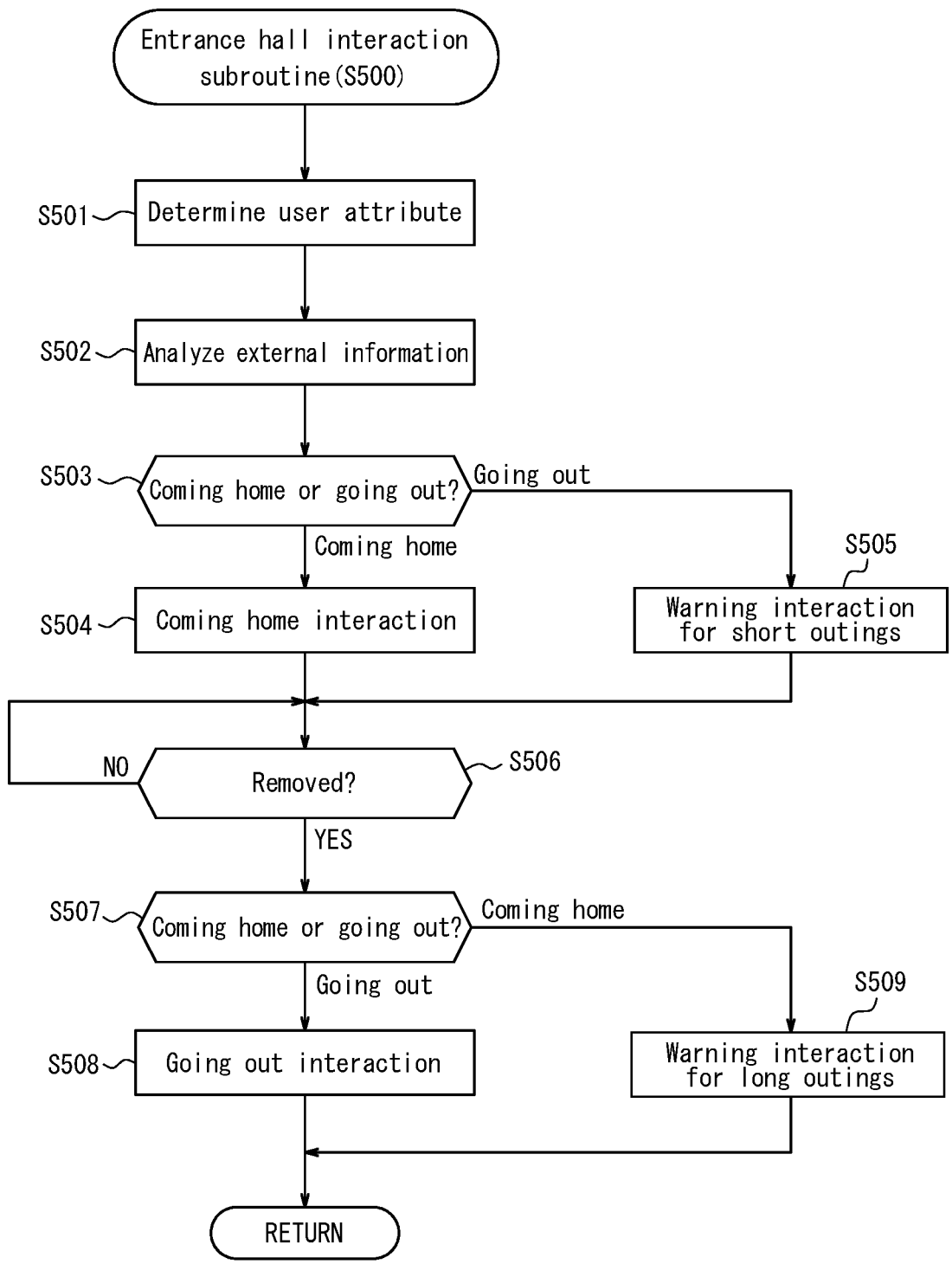
FIG. 8 is a flowchart illustrating an entrance hall interaction subroutine performed by the controller of the mobile terminal illustrated in FIG. 3.

Next, the entrance hall interaction subroutine S500 performed by the controller 22 of the mobile terminal 11 according to the present disclosure will be described with reference to the flowchart of FIG. 8.

The controller 22 determines attributes of a user targeted for interaction in step S501. After the determination, the process proceeds to step S502.

The controller 22 analyzes external information in step S502. After the analysis, the process proceeds to step S503.

In step S503, the controller 22 determines whether the behavior of the user corresponds to coming home or going out, based on a behavior of the user targeted for interaction. When the user is coming home, the process proceeds to step S504. When the user is going out, the process proceeds to step S505.

The controller 22 executes a welcome home interaction in step S504, based on the attributes of the user determined in step S501 and the external information analyzed in step S502. For example, the controller 22 causes the speaker 17 to output speech such as "Welcome home!" regardless of the attributes of the user and the external information. For example, when the attributes of the user indicates a child, the controller 22 causes the speaker 17 to output speech such as "Did you learn a lot?" For example, when the attributes of the user indicates an adult, the controller 22 causes the speaker 17 to output speech such as "Have a good evening!". For example, when the controller 22 determines that it is raining based on the external information, the controller 22 causes the speaker 17 to output speech such as "Did you get wet?". For example, when the controller 22 determines that the commuter train was delayed based on the external information, the controller 22 causes the speaker 17 to output speech such as "How unlucky to have a delayed train!". After execution of the welcome home interaction, the process proceeds to step S506.

In step S505, the controller 22 performs a warning interaction for calling attention corresponding to short outings. For example, the controller 22 causes the speaker 17 to output speech such as "Don't forget your mobile terminal!", "Are you coming back soon?", "Lock the door for safety.", or the like. After execution of the warning interaction for calling attention corresponding to short outings, the process proceeds to step S506.

In step S506, the controller 22 determines whether the mobile terminal 11 is removed from the charging stand 12. When the mobile terminal 11 is not removed, the process repeats step S506. When the mobile terminal 11 is removed, the process proceeds to step S507.

In step S507, the controller 22 determines whether an action of the user indicates coming home or going out, based on a behavior of the user targeted for interaction. In the configuration in which the mobile terminal 11 and the charging stand 12 perform wired communication, the controller 22 determines whether the user came home or the user is going out, based on an image detected by the camera 18. When the controller 22 determines that the user came home, the process proceeds to step S508. When the controller 22 determines that the user is going out, the process proceeds to step S509.

In step S508, the controller 22 executes an outing interaction, based on the attributes of the user determined in step S501 and the external information analyzed in step S502. For example, the controller 22 causes the speaker 17 to output speech such as "Do your best!", "Have a nice day!", or the like, regardless of the attributes of the user and the external information. For example, when the attributes of the user indicates a child, the controller 22 causes the speaker 17 to output speech such as "Don't follow strangers!". For example, when the attributes of the user indicates an adult, the controller 22 causes the speaker 17 to output speech such as "Have you locked the door?", "Make sure the fire is out!", or the like. For example, when the controller 22 determines that it is raining based on the external information, the controller 22 causes the speaker 17 to output speech such as "Have you got an umbrella?" or the like. For example, when the attributes of the user indicates an adult and, simultaneously, the controller 22 determines that it is raining based on the external information, the controller 22 causes the speaker 17 to output speech such as "Have you taken laundry in?" or the like. For example, when the controller 22 determines that it will be cold based on the external information, the controller 22 causes the speaker 17 to output speech such as "Have you got your coat?" or the like. For example, when the controller 22 determines that the commuter train for the school or the work is delayed based on the external information, the controller 22 cause the speaker 17 to output speech such as "Yamanote line is delayed" or the like. For example, when the attributes of the user indicates an adult and, simultaneously, the controller 22 determines that there is a traffic congestion status in the route for the work based on the external information, the controller 22 causes the speaker 17 to output speech such as "There is a traffic congestion between home and the train station" or the like. After execution of the outing interaction, the process ends the entrance hall interaction subroutine S500 and returns to the location determination operation illustrated in FIG. 7 performed by the controller 22.

In step S509, the controller 22 performs a warning interaction for calling attention corresponding to long outings. For example, the controller 22 causes the speaker 17 to output speech such as "Have you locked windows?", "Make sure the fire is out", or the like. After performing the warning interaction for calling attention corresponding to long outings, the process ends the entrance hall interaction subroutine S500 and returns to the location determination operation illustrated in FIG. 7 performed by the controller 22.

Figure 9:
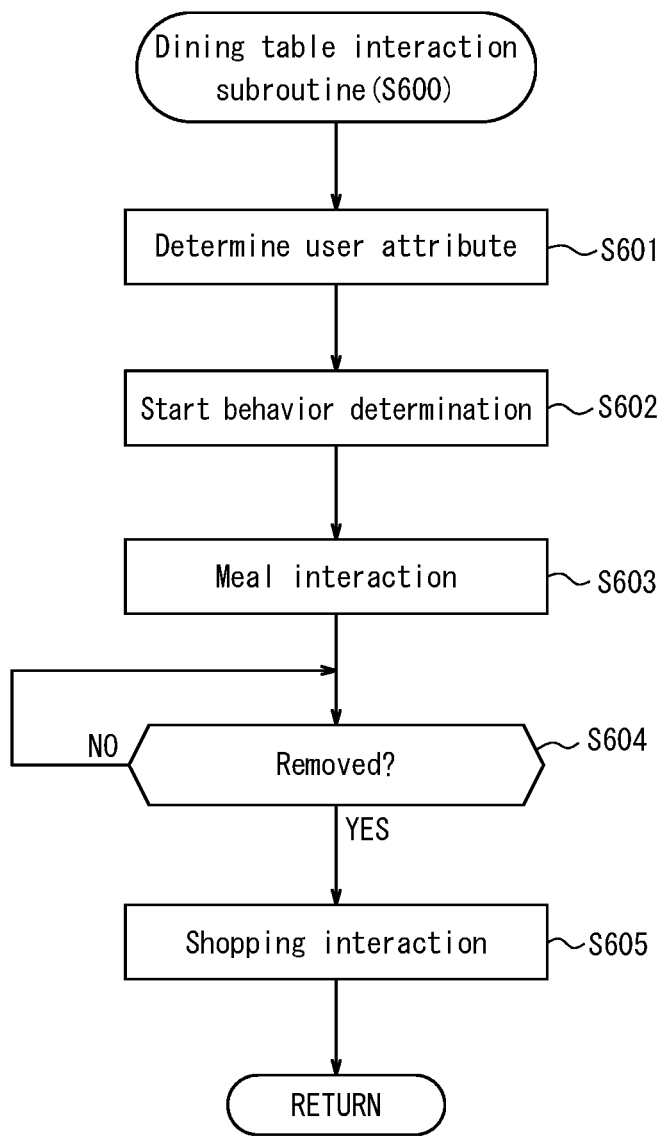
FIG. 9 is a flowchart illustrating a dining table interaction subroutine performed by the controller of the mobile terminal illustrated in FIG. 3.

Next, the dining table interaction subroutine S600 performed by the controller 22 of the mobile terminal 11 according to the present disclosure will be described with reference to the flowchart of FIG. 9.

The controller 22 determines attributes of a user targeted for interaction in step S601. After the determination, the process proceeds to step S602.

The controller 22 starts the determination of a behavior of the user targeted for interaction in step S602. After the start of the determination, the process proceeds to step 603.

In step S603, the controller 22 performs a meal interaction, based on the attributes of the user determined in step S601 and the behavior of the user started in step S602. For example, when the attributes of the user indicates a child and, simultaneously, it is immediately before a meal time according to a history of past behavior, the controller 22 causes the speaker 17 to output speech such as "Getting hungry?" or the like. Note that the history of past behavior is based on, for example, user's behaviors determined by the controller 22 in the past, the lifestyle of the user the controller 22 has learnt, and the like. For example, when the controller 22 determines that the user is preparing a meal, the controller 22 causes the speaker 17 to output speech such as "What's for dinner tonight?" or the like. For example, when the user's behavior corresponds to immediately after starting a meal, the controller 22 causes the speaker 17 to output speech such as "Let's eat various food!" or the like. For example, when the controller 22 determines that the user's behavior indicates that the user has started eating more than a suggested amount based on the attributes of the user, the controller 22 causes the speaker 17 to output speech such as "Don't eat too much!" or the like. After performing the meal interaction for a meal, the process proceeds to step S604.

In step S604, the controller 22 determines whether the mobile terminal 11 is removed from the charging stand 12. When the mobile terminal 11 is not removed, the process repeats step S604. When the mobile terminal 11 is removed, the process proceeds to step S605.

In step S605, the controller 22 executes a shopping interaction based on the attributes of the user determined in step S601. For example, when the attributes of the user indicates an adult, the controller 22 causes the speaker 17 to output speech such as "Sardines are in season now.", "Have you got a shopping list?", or the like. After performing the shopping interaction, the process ends the dining table interaction subroutine S600 and returns to the location determination operation illustrated in FIG. 7 performed by the controller 22.

Figure 10:
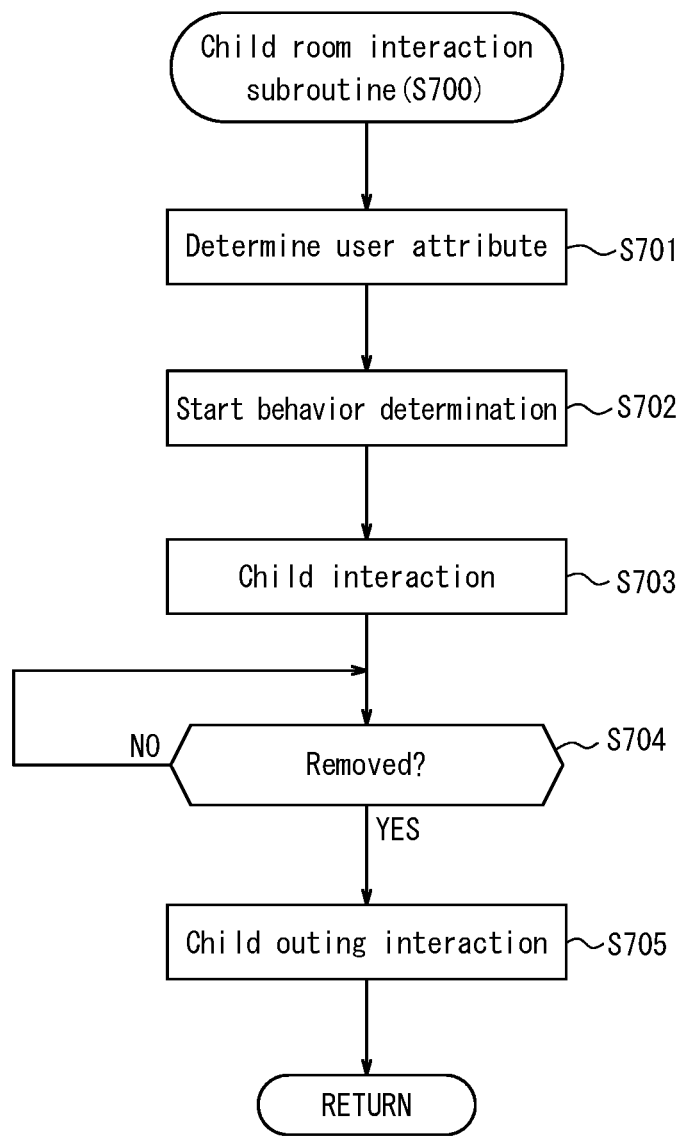
FIG. 10 is a flowchart illustrating a child room interaction subroutine performed by the controller of the mobile terminal illustrated in FIG. 3.

Next, the child room interaction subroutine S700 performed by the controller 22 of the mobile terminal 11 according to the present disclosure will be described with reference to the flowchart of FIG. 10.

The controller 22 determines attributes of a user targeted for interaction in step S701. After the determination, the process proceeds to step S702.

The controller 22 starts the determination of a behavior of the specific user in step S702. After the start of the determination, the process proceeds to step S703.

In step S703, the controller 22 executes a child interaction, based on the attributes of the user determined in step S701 and the behavior of the user started in step S702. For example, when the attributes of the user indicates a student of an elementary school or a junior high school and, simultaneously, the current time corresponds to a time for coming home based on the history of past behavior, the controller 22 causes the speaker 17 to output speech such as "How was the school?", "Any message to parents?", "Any letter for parents?", or the like. For example, when the behavior of the user corresponds to play, the controller 22 causes the speaker 17 to output speech such as "Have you finished your homework?" or the like. For example, when the behavior of the user corresponds to immediately after starting study, the controller 22 causes the speaker 17 to output speech such as "Ask questions any time!" or the like. For example, when the controller 22 determines that a predetermined period has elapsed after determining that the behavior of the user corresponds to studying, the controller 22 causes the speaker 17 to output speech such as "Have a break." or the like. For example, when the attributes of the user indicates a preschooler or a lower grader of an elementary school, the controller 22 causes the speaker 17 to output questions such as a simple addition, subtraction, or multiplication. The controller 22 may cause the speaker 17 to output a popular topic among a gender or preschoolers, lower graders, middle graders, upper graders, junior high school students, or senior high school students, based on the attributes of the user. After executing the child interaction, the process proceeds to step S704.

The controller 22 determines whether the mobile terminal 11 is removed from the charging stand 12 in step S704. When the mobile terminal 11 is not removed, the process repeats step S704. When the mobile terminal 11 is removed, the process proceeds to step S705.

In step S705, the controller 22 performs a child outing interaction, based on the attributes of the user determined in step S701. For example, when the current time corresponds to the time to go to school based on the history of past behavior, the controller 22 causes the speaker 17 to output speech such as "Got everything?", "Got your homework?", or the like. For example, when it is summertime, the controller 22 causes the speaker 17 to output speech such as "Don't forget your hat!" or the like. For example, the controller 22 causes the speaker 17 to output speech such as "Got your handkerchief?" or the like. After performing the child outing interaction, the process ends the child room interaction subroutine S700 and returns to the location determination operation performed by the controller 22 illustrated in FIG. 7.

Figure 11:
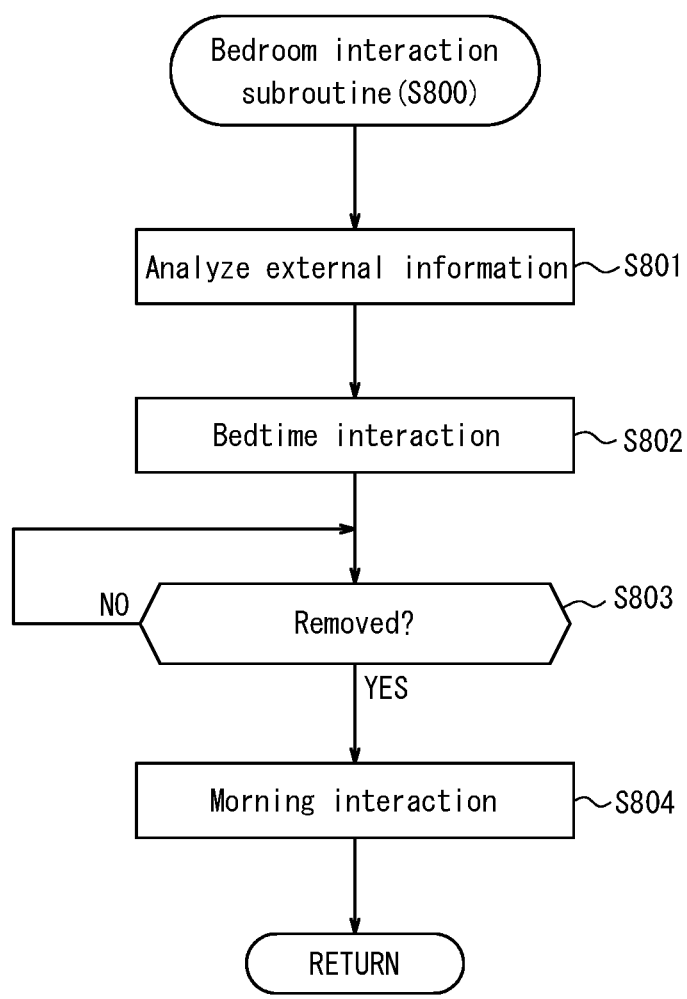
FIG. 11 is a flowchart illustrating a bedroom interaction subroutine performed by the controlled of the mobile terminal illustrated in FIG. 3.

Next, the bedroom interaction subroutine S800 performed by the controller 22 of the mobile terminal 11 according to the present disclosure will be described with reference to the flowchart in FIG. 11.

The controller 22 analyzes the external information in step S801. After the analysis, the process proceeds to step S802.

In step S802, the controller 22 performs a bedtime interaction, based on the external information analyzed in step S801. For example, the controller 22 causes the speaker 17 to output speech such as "Good night", "Have you locked the door?", "Make sure the fire is out", or the like, regardless of the external information. For example, when the predicted temperature is lower than the previous day according to the external information, the controller 22 causes the speaker 17 to output speech such as "It will be chilly tonight." or the like. For example, when the predicted temperature is higher than the previous day according to the external information, the controller 22 causes the speaker 17 to output speech such as "It will be hot tonight." or the like. After execution of the bedtime interaction, the process proceeds to step S803.

The controller 22 determines whether the mobile terminal 11 is removed from the charging stand 12 in step S803. When the mobile terminal 11 is not removed, the process repeats step S803. When the mobile terminal 11 is removed, the process proceeds to step S804.

In step S804, the controller 22 performs a morning interaction, based on the external information analyzed in step S801. For example, the controller 22 causes the speaker 17 to output speech such as "Good morning!", regardless of the external information. For example, when the controller 22 determines that the predicted temperature is lower than the previous day based on the external information, the controller 22 causes the speaker 17 to output speech such as "It will be chilly today. You might want a sweater." or the like. For example, when the controller 22 determines that the predicted temperature is higher than the previous day based on the external information, the controller 22 causes the speaker 17 to output speech such as "It will be warm today. You might want to be lightly dressed." or the like. For example, when the controller 22 determines that it is raining based on the external information, the controller 22 causes the speaker 17 to output speech such as "It's raining You'd better leave soon." or the like. For example, when the controller 22 determines that the commuter train for the school or the work is delayed based on the external information, the controller 22 causes the speaker 17 to output speech such as "The train is delayed. You'd better leave soon." or the like. After execution of the morning interaction, the process ends the bedroom interaction subroutine S800 and returns to the location determination operation illustrated in FIG. 7 performed by the controller 22.

Figure 12:
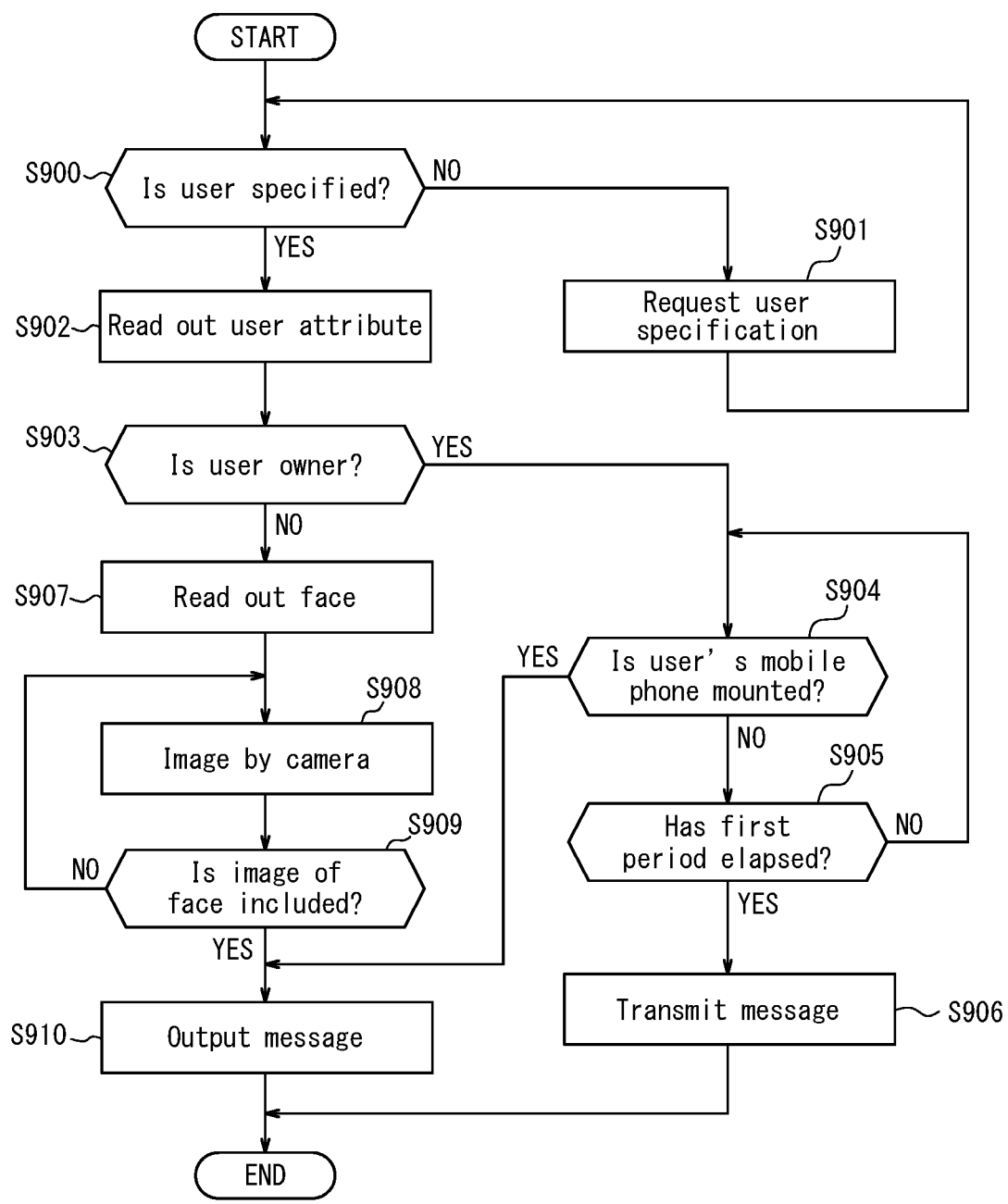
FIG. 12 is a flowchart illustrating a message operation performed by the controller of the charging stand illustrated in FIG. 3.

Next, a message operation performed by the controller 32 of the charging stand 12 according to the present disclosure will be described with reference to the flowchart of FIG. 12. The message operation starts when, for example, the controller 32 determines that a voice detected by the microphone 26 is speaking a message.

The controller 32 determines whether the message specifies an addressed user in step S900. When the message does not specify an addressed user, the process proceeds to step S901. When the message specifies an addressed user, the process proceeds to step S902.

The controller 32 causes the speaker 27 to output a request to specify an addressed user in step S901. After the output of the request, the process returns to step S900.

The controller 32 reads out attributes of the addressed user from the memory 31 in step S902. After the reading, the process proceeds to step S903.

In step S903, the controller 32 determines whether the addressed user is the owner of the mobile terminal 11 stored in the charging stand 12, based on the attributes of the user read out in step S902. When the addressed user is the owner, the process proceeds to step S904. When the addressed user is not the owner, the process proceeds to step S907.

The controller 32 determines whether the mobile terminal 11 of the addressed user is mounted in step S904. When the mobile terminal 11 is mounted, the process proceeds to step S910. When the mobile terminal 11 is not mounted, the process proceeds to step S905.

In step S905, the controller 32 determines whether a first period has elapsed after acquisition of the message. When the first period has not elapsed, the process returns to step S904. When the first period has elapsed, the process proceeds to step S906.

The controller 32 transmits the message to the mobile terminal 11 of the addressed user via the communication interface 23 in step S906. After the transmission, the message operation ends.

In step S907, to which the process proceeds when it is determined in step S903 that the addressed user is not the owner of the mobile terminal 11, the controller 32 reads out an image of the face of the addressed user from the memory 31. After the reading, the process proceeds to step S908.

The controller 32 causes the camera 28 to capture an image of the surroundings in step S908. After the capturing, the process proceeds to step S909.

In step S909, the controller 32 determines whether the image of the face read out in step S907 is included the image captured in step S908. When the image of the face is not included, the process returns to step S908. When the image of the face is included, the process proceeds to step S910.

The controller 32 causes the speaker 27 to output the message in step S910. After the output, the message operation ends.

Figure 13:
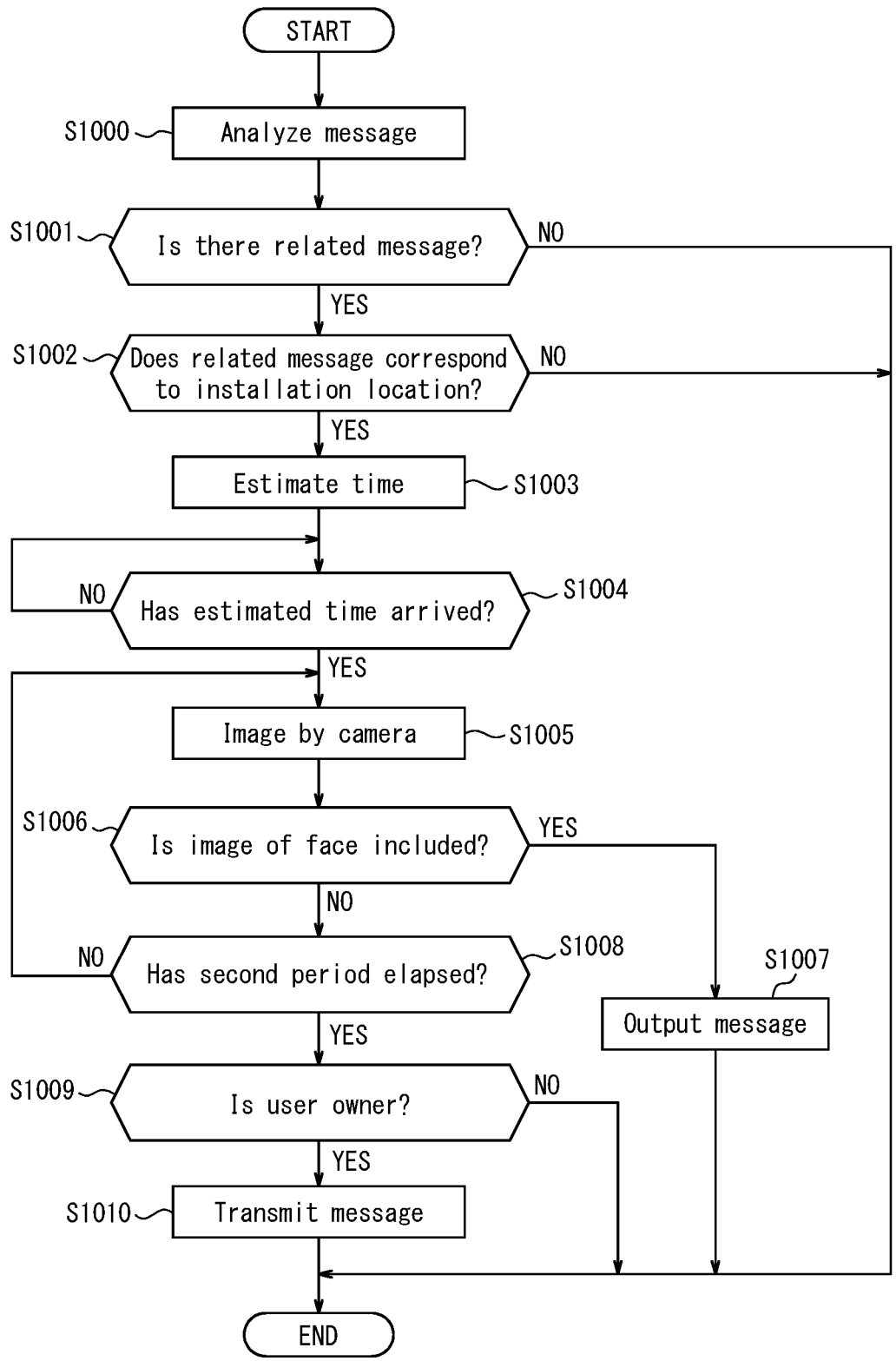
FIG. 13 is a flowchart illustrating a messaging operation performed by the controller of the charging stand illustrated in FIG. 3.

Next, a messaging operation performed by the controller 32 of the charging stand 12 according to the present disclosure will be described with reference to the flowchart of FIG. 13. The messaging operation starts when, for example, the controller 32 determines that a voice detected by the microphone 26 is speaking a message.

The controller 32 analyzes contents of the message in step S1000. After the analysis, the process proceeds to step S1001.

In step S1001, the controller 32 determines whether message related to the message analyzed in step S1000 is stored in the memory 31. When related message is stored, the process proceeds to step S1002. When related message is not stored, the messaging operation ends.

In step S1002, the controller 32 determines whether the related message determined to have been stored in step S1001 corresponds to a current installation location of the charging stand 12. When the related message corresponds to the current installation location, the process proceeds to step S1003. When the related message does not correspond to the current installation location, the messaging operation ends.

In step S1003, the controller 32 identifies a specific user related to an occurrence or execution of a matter associated with the message analyzed in step S1000. Also, the controller 32 reads out the image of the face of the specific user from the memory 31. Further, the controller 32 estimates the time of the occurrence or execution of the matter associated with the message, by analyzing the behavior history of the specific user. After the estimation, the process proceeds to step S1004.

In step S1004, the controller 32 determines whether the time has reached the time estimated in step S1003. When the time has not reached, the process returns to step S1004. When the time has reached, the process proceeds to step S1005.

The controller 32 causes the camera 28 to capture an image of the surroundings in step S1005. After the capturing, the process proceeds to step S1006.

In step S1006, the controller 32 determines whether the image of the face read out in step S1003 is included in the image captured in step S1005. When the image of the face is included, the process proceeds to step S1007. When the image of the face is not included, the process proceeds to step S1008.

In step S1007, the controller 32 causes the speaker 27 to output the message determined to have been stored in step S1001. After the output, the messaging operation ends.

In step S1008, the controller 32 determines whether a second period has elapsed after the determination in step S1004 that the estimated time has reached. When the second period has not elapsed, the process returns to step S1005. When the second period has elapsed, the process proceeds to step S1009.

In step S1009, the controller 32 determines whether an addressed user of the message is the owner of the mobile terminal 11 known to the charging stand 12. When the addressed user is the owner, the process proceeds to step S1010. When the addressed user is not the owner, the messaging operation ends.

In step S1010, the controller 32 transmits the message to the mobile terminal 11 owned by the addressed user via the communication interface 23. After the transmission of the speech, the messaging operation ends.

The charging stand 12 according to the present embodiment having the above configuration outputs a message to a user registered to the mobile terminal 11 when the mobile terminal 11 is mounted on the charging stand 12. Generally, the user of the mobile terminal 11 is likely to start charging the mobile terminal 11 soon after coming home. Thus, the charging stand 12 of the above configuration can notify the user of the message addressed to the user when the user comes home. In this way, the charging stand 12 has improved functionality as compared to conventional charging stands.

When an image captured by the camera 28 includes a specific user, the charging stand 12 according to the present embodiment outputs a message to the specific user. The charging stand 12 having the above configuration can notify a message to a user who does not own the mobile terminal 11. Thus, the charging stand 12 has improved functionality as compared to conventional charging stands.

The charging stand 12 according to the present embodiment outputs a message related to a message addressed to the user at timing based on the behavior history of the user. The charging stand 12 having the above configuration can notify the user of a matter related to the message at appropriate timing.

The mobile terminal 11 according to the present embodiment performs at least one of the speech operation and the voice recognition operation using contents in accordance with an installation location of the charging stand 12 that supplies electric power to the mobile terminal 11. Generally, people change a topic of a conversation based on a location. Thus, the mobile terminal 11 is configured as described above and thus can cause the communication system 10 to output more appropriate speech in accordance with each situation. Accordingly, the mobile terminal 11 has improved functionality as compared to conventional mobile terminals.

The mobile terminal 11 according to the present embodiment performs at least one of the speech operation and the voice recognition operation using contents corresponding to when the mobile terminal 11 is mounted on the charging stand 12 and when the mobile terminal 11 is removed from on the charging stand 12. The mount and removal of the mobile terminal 11 on/from the charging stand 12 can be associated with particular behaviors of the user. Thus, the mobile terminal 11 having this configuration can enable the communication system 10 to output more appropriate speech in accordance with a specific behavior of the user. In this way, the mobile terminal 11 has improved functionality as compared to conventional mobile terminals.

The mobile terminal 11 according to the present embodiment performs at least one of the speech operation and the voice recognition operation using the contents in accordance with attributes of a user targeted for interaction. Generally, people have different topics between their genders or generations. Thus, the mobile terminal 11 having the above configuration can cause the communication system 10 to output more appropriate speech to the user targeted for interaction.

The mobile terminal 11 according to the present embodiment performs at least one of the speech operation and the voice recognition operation using contents corresponding to the external information. The mobile terminal 11 having the above configuration as a constituent element of the communication system 10 can provide a desired advice under the condition of the mount of the mobile terminal 11 on the charging stand or the removal of the mobile terminal 11 from the charging stand 12 at a location of the interaction based on the external information.

When the mobile terminal 11 is mounted on the charging stand 12 according to the present embodiment, the charging stand 12 causes the mobile terminal 11 to perform at least one of the speech operation and the voice recognition operation. The charging stand 12 having the above configuration can function as a companion for the user to talk with, together with the mobile terminal 11 that executes predetermined functions on its own. Thus, the charging stand 12 can function to keep company with elderly living alone when they have a meal, and prevent them from feeling lonely. Thus, the charging stand 12 has improved functionality as compared to conventional charging stands.

The charging stand 12 according to the present embodiment causes the mobile terminal 11 to start at least one of the speech operation and the voice recognition operation when the mobile terminal 11 is mounted on the charging stand 12. Thus, the charging stand 12 can cause the mobile terminal 11 to start an interaction with a user simply in response to the mounting of the mobile terminal 11 on the charging stand 12, without the necessity for a complicated input operation.

The charging stand 12 according to the present embodiment causes the mobile terminal 11 to end at least one of the speech operation and the voice recognition operation when the mobile terminal 11 is removed. Thus, the charging stand 12 can end an interaction with a user simply in response to the removal of the mobile terminal 11, without the necessity for a complicated input operation.

The charging stand 12 according to the present embodiment drives the changing mechanism 25 such that the display 19 of the mobile terminal 11 is directed to the user targeted for interaction concerned in at least one of the speech operation and the voice recognition operation. Thus, the charging stand 12 can enable the user to feel like as if the communication system 10 is a person during an interaction with the user.

The charging stand 12 according to the present embodiment can enable different mobile terminals 11 that communicate with the charging stand 12 to share contents of a conversation with a user. The charging stand 12 configured in this manner can enable another user to know the contents of the conversation with a specific user. Thus, the charging stand 12 can enable a family member at a remote location to share the contents of the conversation and facilitate communication within the family.

The charging stand 12 according to the present embodiment determines a state of a specific target and, when determines that there is an abnormal state, notifies the user of the mobile terminal 11 to that effect. Thus, the charging stand 12 can watch the specific target.

The communication system 10 according to the present embodiment determines speech to output to a user targeted for interaction, based on contents of past conversation, voice, an installation location of the charging stand 12, or the like. Thus, the communication system 10 having the above configuration can output a conversation corresponding to contents of a current conversation of the user, contents of a past conversation by the user, or the installation location of the charging stand 12.

The communication system 10 according to the present embodiment learns the behavior history of a specific user and outputs an advice to the user. The communication system 10 having the above configuration can notify time to take medicine, suggest meals that match user's liking, suggest healthy diet for the user, or suggest an effective exercise the user can continue. Thus, the communication system 10 can remind the user of something or tell the user something of near future to the user.

Further, the communication system 10 according to the present embodiment notifies information associated with the current location. The communication system 10 having this configuration can inform the user of local information specific to a neighborhood of the user's home.

Although the disclosure has been described based on the figures and the embodiment, it is to be understood that various changes and modifications may be implemented based on the present disclosure by those who are ordinarily skilled in the art. Accordingly, such changes and modifications are included in the scope of the disclosure.

For example, although in the present embodiment the controller 22 of the mobile terminal 11 performs the speech operation, the voice recognition operation, the interaction learning, the behavior history learning, the advising based on the behavior history learning, and the notification of information associated with a current location, the controller 32 of the charging stand 12 may perform the same. In this case, the microphone 26, the speaker 27, and the camera 28 of the charging stand 12 may be driven during an interaction with a user, or the microphone 16, the speaker 17, and the camera 18 of the mobile terminal 11 may be driven via the communication interfaces 23 and 13.

Although in the present embodiment the controller 32 of the charging stand 12 performs the determination whether to perform at least one of the speech operation and the voice recognition operation, the messaging operation, and the speech operation, at least some of them may be performed by the controller 22 of the mobile terminal 11. Further, although in the present embodiment the controller 32 of the charging stand 12 determines the current location of the charging stand 12, the controller 22 of the mobile terminal 11 mounted on the charging stand 12 may determine the current location.

In the present embodiment, also, the example variations described above may be combined, such that the controller 32 of the charging stand 12 performs the speech operation, the voice recognition operation, the interaction learning, the behavior history learning, the advising based on the behavior history learning, and the notification of information associated with a current location, and the controller 22 of the mobile terminal 11 determines whether to perform at least one of the speech operation and the voice recognition operation.

Further, although the controller 22 of the mobile terminal 11 performs the registration operation in the present embodiment, the controller 32 of the charging stand 12 may perform the registration operation.

The network used herein includes, unless otherwise specified, the Internet, an ad hoc network, LAN (Local Area Network), WAN (Wide Area Network), MAN (Metropolitan Area Network), a cellular network, WWAN (Wireless Wide Area Network), WPAN (Wireless Personal Area Network), PSTN (Public Switched Telephone Network), terrestrial wireless network (Terrestrial Wireless Network), other network, or any combination thereof. An element of the wireless network includes, for example, an access point (e.g., a Wi-Fi access point), a Femtocell, or the like. Further, a wireless communication apparatus may connected to a wireless network that uses Wi-Fi, Bluetooth, a cellular communication technology (e.g. CDMA (Code Division Multiple Access), TDMA (Time Division Multiple Access), FDMA (Frequency Division Multiple Access), FDMA (Orthogonal Frequency Division Multiple Access), SC-FDMA (Single-Carrier Frequency Division Multiple Access)), or other wireless technologies and/or technical standards. The network can employ one or more technologies, such as UTMS (Universal Mobile Telecommunications System), LTE (Long Term Evolution), EV-DO (Evolution-Data Optimized or Evolution-Data), GSM® (Global System for Mobile communications, GSM is a registered trademark in Japan, other countries, or both), WiMAX (Worldwide Interoperability for Microwave Access), CDMA-2000 (Code Division Multiple Access-2000), or TD-SCDMA (Time Division Synchronous Code Division Multiple Access).

Circuit configurations of the communication interfaces 13 and 23 provide functionality by using various wireless communication network such as, for example, WWAN, WLAN, WPAN, or the like. WWAN may include CDMA network, TDMA network, FDMA network, FDMA network, SC-FDMA network, or the like. CDMA network may implement one or more RAT (Radio Access Technology) such as CDMA2000, Wideband-CDMA (W-CDMA), or the like. CDMA2000 includes a standard such as IS-95, IS-2000, or IS-856. TDMA network may implement RAT such as GSM, D-AMPS (Digital Advanced Phone System), or the like. GSM and W-CDMA are described in documents issued by a consortium called 3rd Generation Partnership Project (3GPP). CDMA2000 is described in documents issued by a consortium called 3rd Generation Partnership Project 2 (3GPP2). WLAN may include IEEE802.11x network. WPAN may include Bluetooth network, IEEE802.15x, or other types of network. CDMA may be implemented as a wireless technology such as UTRA (Universal Terrestrial Radio Access) or CDMA2000. TDMA may be implemented by using a wireless technology such as GSM/GPRS (General Packet Radio Service)/EDGE (Enhanced Data Rates for GSM Evolution). OFDMA may be implemented by a wireless technology such as IEEE (Institute of Electrical and Electronics Engineers) 802.11 (Wi-Fi), IEEE802.16 (WiMAX), IEEE802.20, E-UTRA (Evolved UTRA), or the like. These technologies can be used for any combination of WWAN, WLAN and/or WPAN. Also, these technologies may be implemented to use UMB (Ultra Mobile Broadband) network, HRPD (High Rate Packet Data) network, CDMA20001X network, GSM, LTE (Long-Term Evolution), or the like.

The memories 21 and 31 described above may store an appropriate set of computer instructions such as program modules that are used to cause a processor to perform the techniques disclosed herein, and a data structure. A computer-readable medium includes electrical connection through one or more wires, a magnetic disk storage, a magnetic cassette, a magnetic tape, another magnetic or optical storage device (e.g., CD (Compact Disk), Laser Disc® (Laser Disc is a registered trademark in Japan, other countries, or both), DVD (Digital Versatile disc), Floppy Disk, or Blu-ray Disc), a portable computer disk, RAM (Random Access memory), ROM (Read-Only memory), EPROM, EEPROM, a ROM such as a flash memory which is rewritable and programmable, other tangible storage media capable of storing information, or any combination thereof. The memory may be provided within and/or external to the processor/processing unit. As used herein, the term "memory" means any kind of a long-term storage, a short-term storage, a volatile memory, a nonvolatile memory, or other memories, and does not limit a type of a memory, the number of memories, and a type of a medium for storing.

Note that a system as disclosed herein includes various modules and/or units configured to perform a specific function, and these modules and units are schematically illustrated to briefly explain their functionalities and do not specify particular hardware and/or software. In that sense, these modules, units, and other components simply need to be hardware and/or software configured to substantially perform the specific functions described herein. Various functions of different components may be realized by any combination or subdivision of hardware and/or software, and each of the various functions may be used separately or in any combination. Further, an input/output device, an I/O device, or user interface configured as, and not limited to, a keyboard, a display, a touch screen, and a pointing device may be connected to the system directly or via an intermediate 110 controller. Thus, various aspects of the present disclosure may be realized in many different embodiments, all of which are included within the scope of the present disclosure.

REFERENCE SIGNS LIST 10 communication system
11 mobile terminal
12 charging stand
13 communication interface
14 power receiving unit
15 battery
16 microphone
17 speaker
18 camera
19 display
20 input interface
21 memory
22 controller
23 communication interface
24 power supply unit
25 changing mechanism
26 microphone
27 speaker
28 camera
29 motion sensor
30 mount sensor
31 memory
32 controller

The invention claimed is:

1. A charging stand comprising:
a controller configured to receive a notification that a mobile terminal is mounted on the charging stand and to cause the mobile terminal to perform at least one of a speech operation,
a voice recognition operation upon receiving the notification that the mobile terminal is mounted on the charging stand, and
a motor configured to change an orientation of the mobile terminal when the mobile terminal is mounted on the charging stand,
wherein the controller is configured to drive the motor such that a display of the mobile terminal is directed to a user which is a target for execution of at least one of the speech operation and the voice recognition operation.

2. A charging stand comprising:
a controller configured to receive a notification that a mobile terminal is mounted on the charging stand and perform at least one of a speech operation and a voice recognition operation upon receiving the notification that the mobile terminal is mounted on the charging stand,
wherein the controller is configured to output a message to a user registered to the mobile terminal when the mobile terminal is mounted on the charging stand.

3. The charging stand according to claim 2, further comprising a camera configured to capture an image,
wherein the controller is configured to output the message to the user when a specific user is included in the image.

4. The charging stand according to claim 2,
wherein the controller is configured to output speech related to the message to the user at timing based on a behavior history of the user.

5. A mobile terminal comprising:
a controller configured to receive a notification from a charging stand that the mobile terminal is mounted on the charging stand and perform at least one of a speech operation and a voice recognition operation upon receiving the notification that the mobile terminal is mounted on the charging stand,
wherein the controller is configured to cause the charging stand to output a message to a registered user when the mobile terminal is mounted on the charging stand.

6. The mobile terminal according to claim 5,
wherein the controller is configured to output speech related to the message to the registered user at timing based on a behavior history of the registered user.

* * * * *